United States Patent
Shang et al.

(10) Patent No.: US 10,231,037 B2
(45) Date of Patent: Mar. 12, 2019

(54) OPTICAL BURST TRANSPORT NETWORK, NODE, TRANSMISSION METHOD AND COMPUTER STORAGE MEDIUM

(71) Applicant: ZTE CORPORATION, Shenzhen, Guangdong (CN)

(72) Inventors: Yingchun Shang, Shenzhen (CN); Lei Wang, Shenzhen (CN); Huitao Wang, Shenzhen (CN); Sheping Shi, Shenzhen (CN)

(73) Assignee: XI'AN ZHONGXING NEW SOFTWARE CO.LTD, Xi'an (CN)

( * ) Notice: Subject to any disclaimer, the term of this patent is extended or adjusted under 35 U.S.C. 154(b) by 0 days.

(21) Appl. No.: 15/113,277

(22) PCT Filed: Jul. 23, 2014

(86) PCT No.: PCT/CN2014/082843
§ 371 (c)(1),
(2) Date: Jul. 21, 2016

(87) PCT Pub. No.: WO2015/109795
PCT Pub. Date: Jul. 30, 2015

(65) Prior Publication Data
US 2017/0006362 A1    Jan. 5, 2017

(30) Foreign Application Priority Data

Jan. 22, 2014 (CN) .......................... 2014 1 0030558

(51) Int. Cl.
*H04J 3/16* (2006.01)
*H04Q 11/00* (2006.01)
(Continued)

(52) U.S. Cl.
CPC ..... *H04Q 11/0066* (2013.01); *H04B 10/0793* (2013.01); *H04B 10/275* (2013.01);
(Continued)

(58) Field of Classification Search
None
See application file for complete search history.

(56) References Cited

U.S. PATENT DOCUMENTS 9,793,985 B2 * 10/2017 An ..................... H04Q 11/0066
2005/0147411 A1    7/2005 Hamou
(Continued)

FOREIGN PATENT DOCUMENTS

CN    1761181 A    4/2006
CN    101039333 A    9/2007
(Continued)

OTHER PUBLICATIONS

International Search Report in international application No. PCT/CN2014/082843, dated Nov. 4, 2014, 2 pgs.
(Continued)

*Primary Examiner* — Willie J Daniel, Jr.
(74) *Attorney, Agent, or Firm* — Cooper Legal Group, LLC

(57) ABSTRACT

Disclosed are an optical burst transport network, a node, a transmission method and a computer storage medium. The method comprises: measuring, by a master node, the network ring length of an OBTN, and according to a measurement result, calculating the length of a data frame, the number of time slots in the data frame, the length of the time slots and the guard interval of the time slots; according to the calculated length of the data frame, the number of time slots in the data frame, the length of the time slots and the guard interval of the time slots, sending a testing data frame and a testing control frame to a slave node to conduct frame synchronization training and time slot synchronization training; according to a result of the frame synchronization training and a result of the time slot synchronization training, sending, by the master node, a data frame and a bandwidth map to the slave node; and according to a
(Continued)

bandwidth request sent from the node, generating, by the master node, a new bandwidth map, and sending the new bandwidth map to the slave node.

13 Claims, 8 Drawing Sheets

(51) Int. Cl.
    *H04B 10/275* (2013.01)
    *H04L 12/841* (2013.01)
    *H04L 12/26* (2006.01)
    *H04L 12/42* (2006.01)
    *H04L 12/911* (2013.01)
    *H04L 12/917* (2013.01)
    *H04L 12/437* (2006.01)
    *H04B 10/079* (2013.01)

(52) U.S. Cl.
    CPC .......... *H04L 12/422* (2013.01); *H04L 12/437* (2013.01); *H04L 43/50* (2013.01); *H04L 47/28* (2013.01); *H04L 47/72* (2013.01); *H04L 47/76* (2013.01); *H04Q 2011/0083* (2013.01)

(56) References Cited

U.S. PATENT DOCUMENTS

2007/0242625 A1  10/2007  Dunne
2009/0162064 A1  6/2009  Mizutani
2015/0131991 A1*  5/2015  Hattori ................ H04J 14/0212
    398/47
2016/0308610 A1*  10/2016  An ..................... H04Q 11/0066

FOREIGN PATENT DOCUMENTS

CN    101621714 A    1/2010
CN    101895367 A    11/2010
CN    101959083 A    1/2011
CN    102783178 A    11/2012
CN    103026729 A    4/2013
EP    2348691 A1    7/2011
EP    2387181 A1    11/2011
EP    2863589 A1    4/2015
JP    2005522091 A    7/2005
WO    2013187474 A1    12/2013

OTHER PUBLICATIONS

English Translation of the Written Opinion of the International Search Authority in international application No. PCT/CN2014/082843, dated Nov. 4, 2014, 6 pgs.

Supplementary European Search Report in European application No. 14879808.5, dated Nov. 8, 2016, 10 pgs.

Int. Search Report cited in PCT Application No. PCT/CN2014/082843 dated Nov. 4, 2014, 5 pgs.

Written Opinion cited in PCT Application No. PCT/CN2014/082843 dated Nov. 4, 2014, 9 pgs.

* cited by examiner

OPTICAL BURST TRANSPORT NETWORK, NODE, TRANSMISSION METHOD AND COMPUTER STORAGE MEDIUM

TECHNICAL FIELD

The disclosure relates to the technical field of optical networks, and in particular to an Optical Burst Transport Network (OBTN), a node, a transmission method and a computer storage medium.

BACKGROUND

An OBTN is an optical transmission technology with a granularity between Optical Circuit Switching (OCS) and Optical Packet Switching (OPS), and its key idea is to make full use of a tremendous bandwidth of an optical fibre and flexibility of electronic control to separate a control channel from a data channel. A full optical switching technology is performed on a data channel by adopting Optical Burst (OB) switching unit-based data frames, and control frames and data frames in a control channel correspond one to one and control frams are also transmitted in the optical domain, but are switched to the electric domain for processing at nodes to implement reception and update of corresponding control information in a continuous reception and transmission manner. It will be understood that there may be more than one data channel and more than one control channel, and a section of Fibre Delay Line (FDL) with a fixed length may be utilized to delay bursts in each data channel in case of output competition of the bursts of multiple data channels; and when data frame and control frame channels simultaneously reach a certain node, or the node has no sufficient time to perform reception and transmission control of data frame according to an indication of a control frame after receiving the control frame, the FDL may be utilized to delay the data channels, delay time being exactly equal to time for processing control frame at each node, so as to compensate for a delay difference between the control channels and the data channels to solve the problem of competition. Therefore, an OBTN may implement dynamic adaptation to and good support for various traffic scenarios, and may improve resource utilization efficiency and network flexibility; and in addition, the advantages of high speed, high capacity and low cost of an optical layer are reserved, and applicability to various topologies such as star/tree/ring network is achieved.

However, using an FDL in a current OBTN technology may make a loop length reach a certain fixed length and has requirements on use of a delay optical fibre for realizing a specific relationship between a data frame and a control frame in a node, setting of an OB packet into a fixed length and setting of a guard interval into a fixed length, thereby complicating a network design, bringing high cost, making length control complex, inadequately keeping a network stable and making it difficult to construct and regulate the network when the loop length changes.

SUMMARY

In order to solve the existing technical problem, the embodiment of the disclosure is intended to provide an OBTN, a node, a transmission method and a computer storage medium, which may simplify a network design, solve a problem caused by an FDL, lower construction cost of the OBTN, implement flexible construction of the OBTN without greatly limiting throughput of the network, make full use of the throughput of the network and facilitate increase of an operation rate of the network and improvement of efficiency and throughput of the network.

In order to achieve the purpose, the technical solutions of the disclosure are implemented as follows.

In a first aspect, the embodiment of the disclosure provides a transmission method for an OBTN, which may include that:

a master node measures a network loop length of the OBTN, and calculates a length of a data frame, the number of timeslots in the data frame, a length of the timeslot and a guard interval for the timeslot according to a result of the measurement;

the master node transmits a test data frame and a test control frame to a slave node according to the calculated length of the data frame, number of the timeslots in the data frame, length of the timeslot and guard interval for the timeslot, for performing frame synchronization training and timeslot synchronization training;

the slave node performs frame the synchronization training and the timeslot synchronization training according to the test data frame and the test control frame;

the master node transmits the data frame and a control frame containing a bandwidth map to the slave node according to a result of the frame synchronization training and a result of the timeslot synchronization training;

the slave node controls reception and transmission of each timeslot in the data frame according to the bandwidth map, the result of the frame synchronization training and the result of the timeslot synchronization training, and transmits a request for bandwidth to the master node; and the master node performs bandwidth allocation calculation according to the request for bandwidth, generates a new bandwidth map and transmits the new bandwidth map to the slave node.

According to a first possible implementation manner, with reference to the first aspect, the step that the master node measures the network loop length of the OBTN may include that: a loop length of a control channel of the OBTN and a loop length of a data channel of the OBTN are measured, wherein the step that the loop length of the data channel of the OBTN is measured may include that: any node in the OBTN transmits an OB packet to the master node via the data channel of the OBTN; the master node measures a first time difference between two successive receptions of the OB packet, and determines the first time difference as the loop length of the data channel of the OBTN; and the step that the loop length of the control channel of the OBTN is measured may include that: a second time difference between time when a header of the control frame is transmitted by the master node and time when the header of the control frame is received by the master node is determined as the loop length of the control channel of the OBTN.

According to a second possible implementation manner, with reference to the first aspect or the first possible implementation manner, the step that the master node transmits the test data frame and the test control frame to the slave node according to the calculated length of the data frame, number of the timeslots in the data frame, length of the timeslot and guard interval for the timeslot, for performing frame synchronization training and timeslot synchronization training may include that:

the master node transmits the test data frame and the test control frame to the slave node according to the calculated length of the data frame, number of the timeslots in the data frame, length of the timeslot and guard interval for the timeslot, wherein the test control frame contains information about the length of the data frame, the number of the timeslots in the data frame, the length of the timeslot and the guard interval for the timeslot;

a time delay between time when the test control frame is returned to the master node and time when the test data frame is returned to the master node is acquired; and a time interval between time when the master node transmits the control frame and time when the master node transmits the data frame after transmitting the control frame is acquired, wherein the time interval may contain the time delay.

According to a third possible implementation manner, with reference to the second possible implementation manner, the step that the time delay between time when the test control frame is returned to the master node and time when the test data frame is returned to the master node is acquired may include that:

the master node transmits the test data frame and the test control frame, and measures the time delay between time when the test control frame is returned to the master node and time when the test data frame is returned to the master node; or a difference value between the second time difference and the first time difference is determined as the time delay between time when the test control frame is returned to the master node and time when the test data frame is returned to the master node.

According to a fourth possible implementation manner, with reference to the second possible implementation manner, the step that the slave node performs frame synchronization training and timeslot synchronization training according to the test data frame and the test control frame may include that:

the slave node determines a time delay between time when a header of the test control frame is received and time when a beginning of a first timeslot in the test data frame is received as a reference time delay between time when the control frame is received by the slave node and time when the data frame is received by the slave node;

the slave node determines a time position of each timeslot in the data frame according to the number of the timeslots in the data frame, the guard interval for the timeslot and the length of the timeslot contained in the test control frame;

the slave node determines accurate time at which a timeslot is transmitted by the slave node according to the deviation of time at which a timeslot is transmitted by the slave node measured by another node; and the slave node transmits the test data frame according to the length of the data frame, the number of the timeslots in the data frame and the length of the timeslot contained in the test control frame as well as the accurate time at which a timeslot is transmitted.

In a second aspect, the embodiment of the disclosure further provides a transmission method for an OBTN, which may be applied to a master node and include that:

the master node measures a network loop length of the OBTN, and calculates a length of a data frame, the number of timeslots in the data frame, a length of the timeslot and a guard interval for the timeslot according to a result of the measurement;

the master node transmits a test data frame and a test control frame to a slave node according to the calculated length of the data frame, number of the timeslots in the data frame, length of the timeslot and guard interval for the timeslot, for performing frame synchronization training and timeslot synchronization training;

the master node transmits the data frame and a control frame containing a bandwidth map to the slave node according to a result of the frame synchronization training and a result of the timeslot synchronization training; and the master node performs bandwidth allocation calculation according to a request for bandwidth transmitted by the slave node, generates a new bandwidth map and transmits the new bandwidth map to the slave node.

According to a first possible implementation manner, with reference to the second aspect, the step that the master node measures the network loop length of the OBTN may include that: a loop length of a control channel of the OBTN and a loop length of a data channel of the OBTN are measured, wherein the step that the loop length of the data channel of the OBTN is measured may include that: any node in the OBTN transmits an OB packet to the master node via the data channel of the OBTN; the master node measures a first time difference between two successive receptions of the OB packet, and determines the first time difference as the loop length of the data channel of the OBTN; and the step that the loop length of the control channel of the OBTN is measured may include that: a second time difference between time when a header of the control frame is transmitted by the master node and time when the header of the control frame is received by the master node is determined as the loop length of the control channel of the OBTN.

According to a second possible implementation manner, with reference to the second aspect or the first possible implementation manner, the step that the master node transmits the test data frame and the test control frame to the slave node according to the calculated length of the data frame, number of the timeslots in the data frame, length of the timeslot and guard interval for the timeslot, for performing frame synchronization training and timeslot synchronization training may include that:

the master node transmits the test data frame and the test control frame to the slave node according to the calculated length of the data frame, number of the timeslots in the data frame, length of the timeslot and guard interval for the timeslot, wherein the test control frame contains information about the length of the data frame, the number of the timeslots in the data frame, the length of the timeslot and the guard interval for the timeslot;

a time delay between time when the test control frame is returned to the master node and time when the test data frame is returned to the master node is acquired; and a time interval between time when the master node transmits the control frame and time when the master node transmits the data frame after transmitting the control frame is acquired, wherein the time interval may contain the time delay.

According to a third possible implementation manner, with reference to the second possible implementation manner, the step that the time delay between time when the test control frame is returned to the master node and time when the test data frame is returned to the master node is acquired may include that:

the master node transmits the test data frame and the test control frame, and measures the time delay between time when the test control frame is returned to the master node and time when the test data frame is returned to the master node; or a difference value between the second time difference and the first time difference is determined as the time delay between time when the test control frame is returned to the master node and time when the test data frame is returned to the master node.

On the third aspect, the embodiment of the disclosure further provides a transmission method for an OBTN, which may be applied to a slave and include that:

the slave node performs frame synchronization training and timeslot synchronization training according to a test data frame and test control frame transmitted by a master node, and transmits a result of the frame synchronization training and a result of the timeslot synchronization training to the master node; and the slave node controls reception and transmission of each timeslot in a data frame according to a bandwidth map transmitted by the master node as well as the result of the frame synchronization training and the result of the timeslot synchronization training, and transmits a request for bandwidth to the master node.

According to a first possible implementation manner, with reference to the third aspect, the step that the slave node performs frame synchronization training and timeslot synchronization training according to the test data frame and the test control frame may include that:

the slave node determines a time delay between time when a header of the test control frame is received and time when a beginning of a first timeslot in the test data frame is received as a reference time delay between time when a control frame is received by the slave node and time when the data frame is received by the slave node;

the slave node determines a time position of each timeslot in the data frame according to the number of timeslots in the data frame, a guard interval for the timeslot and a length of the timeslot contained in the test control frame;

the slave node determines accurate time at which a timeslot is transmitted by the slave node according to the deviation of time at which a timeslot is transmitted by the slave node measured by another node; and the slave node transmits the test data frame according to the length of the data frame, the number of the timeslots in the data frame, and the length of the timeslot contained in the test control frame as well as the accurate time at which a timeslot is transmitted.

In a fourth aspect, the embodiment of the disclosure provides a master node, which may include:

a measurement unit configured to measure a network loop length of an OBTN;

a calculation unit configured to calculate a length of a data frame, the number of timeslots in the data frame, a length of the timeslot and a guard interval for the timeslot according to a result of the measurement of the measurement unit;

a first transmitting unit configured to transmit a test data frame and a test control frame to a slave node according to the calculated length of the data frame, number of the timeslots in the data frame, length of the timeslot and guard interval for the timeslot;

a first training unit configured to perform frame synchronization training and timeslot synchronization training according to the test data frame and test control frame transmitted by the first transmitting unit;

wherein the first transmitting unit may be further configured to transmit the data frame and a control frame containing a bandwidth map according to results of the frame synchronization training and the timeslot synchronization training performed by the first training unit;

a first receiving unit configured to receive a request for bandwidth;

a generation unit configured to perform bandwidth allocation calculation according to the request for bandwidth, and generate a new bandwidth map; and wherein the first transmitting unit may be further configured to transmit the new bandwidth map.

According to a first possible implementation manner, with reference to the fourth aspect, the measurement unit may be configured to measure a loop length of a control channel of the OBTN and a loop length of a data channel of the OBTN, wherein the operation that the measurement unit measures the loop length of the control channel of the OBTN may include that: a first time difference between two successive receptions of an OB packet is measured, and the first time difference is determined as the network loop length of the OBTN, wherein the OB packet may be transmitted from any node in the OBTN to the master node via the data channel of the OBTN; and the operation that the measurement unit measures the loop length of the data channel of the OBTN may include that: a second time difference between time when a header of the control frame is transmitted by the master node and time when the header of the control frame is received by the master node is determined as the loop length of the control channel of the OBTN.

According to a second possible implementation manner, with reference to the fourth aspect or the first possible implementation manner, the first transmitting unit may be configured to transmit the test data frame and the test control frame to the slave node according to the calculated length of the data frame, number of the timeslots in the data frame, length of the timeslot and guard interval for the timeslot, wherein the test control frame contains information about the length of the data frame, the number of the timeslots in the data frame, the length of the timeslot and the guard interval for the timeslot; and the first training unit may be configured to acquire a time delay between time when the test control frame is returned to the master node and time when the test data frame is returned to the master node, and acquire a time interval between time when the master node transmits the control frame and time when the master node transmits the data frame after transmitting the control frame, wherein the time interval may contain the time delay.

According to a third possible implementation manner, with reference to the second possible implementation manner, the first training unit may be configured to measure the time delay between time when the test control frame is returned to the master node and time when the test data frame is returned to the master node after the test data frame and the test control frame are transmitted, or, determine a difference value between the second time difference and the first time difference as the time delay between time when the test control frame is returned to the master node and time when the test data frame is returned to the master node.

On the fifth aspect, the embodiment of the disclosure provides a slave node, which may include:

a second receiving unit configured to receive a test data frame and a test control frame;

a second training unit configured to perform frame synchronization training and timeslot synchronization training according to the test data frame and test control frame received by the second receiving unit;

wherein the second receiving unit may be further configured to receive a data frame and a control frame containing a bandwidth map;

a reception and transmission control unit configured to control reception and transmission of each timeslot in the data frame according to the bandwidth map received by the second receiving unit as well as a result of the frame synchronization training and a result of the timeslot synchronization training;

a second transmitting unit configured to transmit a request for bandwidth; and wherein the second receiving unit may be further configured to receive a new bandwidth map.

According to a first possible implementation manner, with reference to the fifth aspect, the second training unit may be configured to determine a time delay between time when a header of the test control frame is received and time when a beginning of a first timeslot in the test data frame is received as a reference time delay between time when a control frame is received by the slave node and time when the data frame is received;

determine a time position of each timeslot in the data frame according to the number of timeslots in the data frame, a guard interval for the timeslot and a length of the timeslot contained in the test control frame;

determine accurate time at which a timeslot is transmitted by the slave node according to the deviation of time at which a timeslot is transmitted by the slave node measured by another node; and transmit the test data frame according to the length of the data frame, the number of the timeslots in the data frame, and the length of the timeslot contained in the test control frame as well as the accurate time at which a timeslot is transmitted.

In a sixth aspect, the embodiment of the disclosure provides an OBTN, which may include: a master node and at least one slave node;

the master node may be configured to measure a network loop length of the OBTN, calculate a length of a data frame, the number of timeslots in the data frame, a length of the timeslot and a guard interval for the timeslot according to a result of the measurement, transmit a test data frame and a test control frame to a slave node according to the calculated length of the data frame, number of the timeslots in the data frame, length of the timeslot and guard interval for the timeslot, for performing frame synchronization training and timeslot synchronization training, the master node may also be configured to transmit the data frame and a control frame containing a bandwidth map to the slave node according to a result of the frame synchronization training and a result of the timeslot synchronization training, and the master node may further be configured to perform bandwidth allocation calculation according to a request for bandwidth, generate a new bandwidth map and transmit the new bandwidth map to the slave node; and the slave node may be configured to perform frame synchronization training and timeslot synchronization training according to the test data frame and the test control frame, and may further be configured to control reception and transmission of each timeslot in the data frame according to the bandwidth map, the result of the frame synchronization training and the result of the timeslot synchronization training, and transmit the request for bandwidth to the master node.

In a seventh aspect, the embodiment of the disclosure further provides a computer storage medium having stored therein computer-executable instructions for executing the transmission method, applied to the master node, for the OBTN in the embodiment of the disclosure.

In an eighth aspect, the embodiment of the disclosure further provides a computer storage medium having stored therein computer-executable instructions for executing the transmission method, applied to the slave node, for the OBTN in the embodiment of the disclosure.

The embodiment of the disclosure provides the OBTN, the node, the transmission method and the computer storage medium, and by network loop length detection of the master node and frame synchronization training and timeslot synchronization training over the nodes in the network, the network design may be simplified, construction cost of the OBTN may be lowered, flexible construction of the OBTN may be implemented without greatly limiting the throughput of the network, and increase of the operation rate of the network and improvement of the efficiency and throughput of the network are facilitated.

DETAILED DESCRIPTION

The technical solutions in the embodiment of the disclosure will be clearly and completely described below with reference to the drawings in the embodiment of the disclosure.

Figure 1:
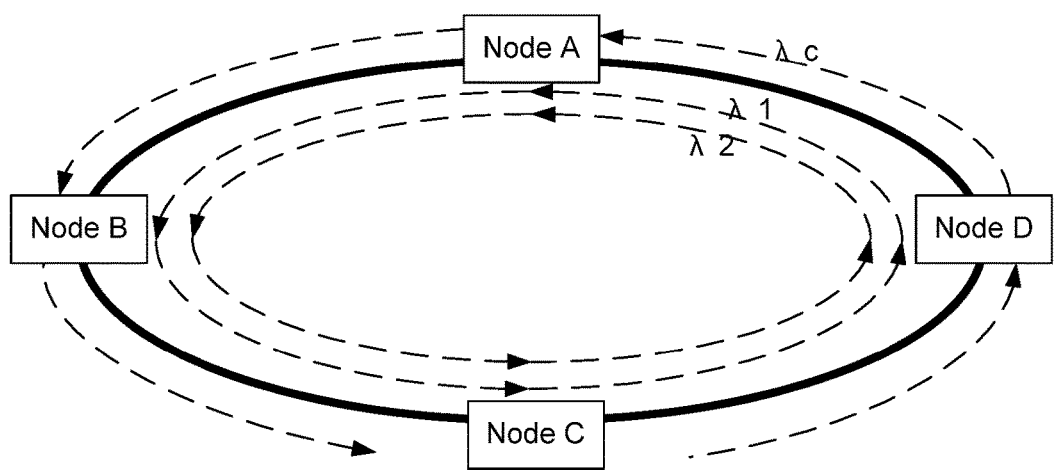
FIG. 1 is a schematic diagram of structure of an OBTN according to an embodiment of the disclosure.

FIG. 1 shows an application scenario according to an embodiment of the disclosure, wherein in an OBTN with a unidirectional ring topology structure consisting of four nodes A, B, C and D, node A may be set as master node, the remaining nodes B, C and D may be set as slave nodes, the black solid circle schematically represents a fibre loop structure, and dotted arrows in the circle represent a transmission direction of a data channel and a data frame; and dotted arrows outside the circle represent a transmission direction of a control channel and a control frame. In an example, in FIG. 1, the data channel is configured with two wavelengths $\lambda1$ and $\lambda2$, the control channel is configured with a wavelength λc. It will be understood that the figure is only adopted to exemplarily describe the technical solution of the embodiment of the disclosure and not intended to be any limitation.

Figure 2:
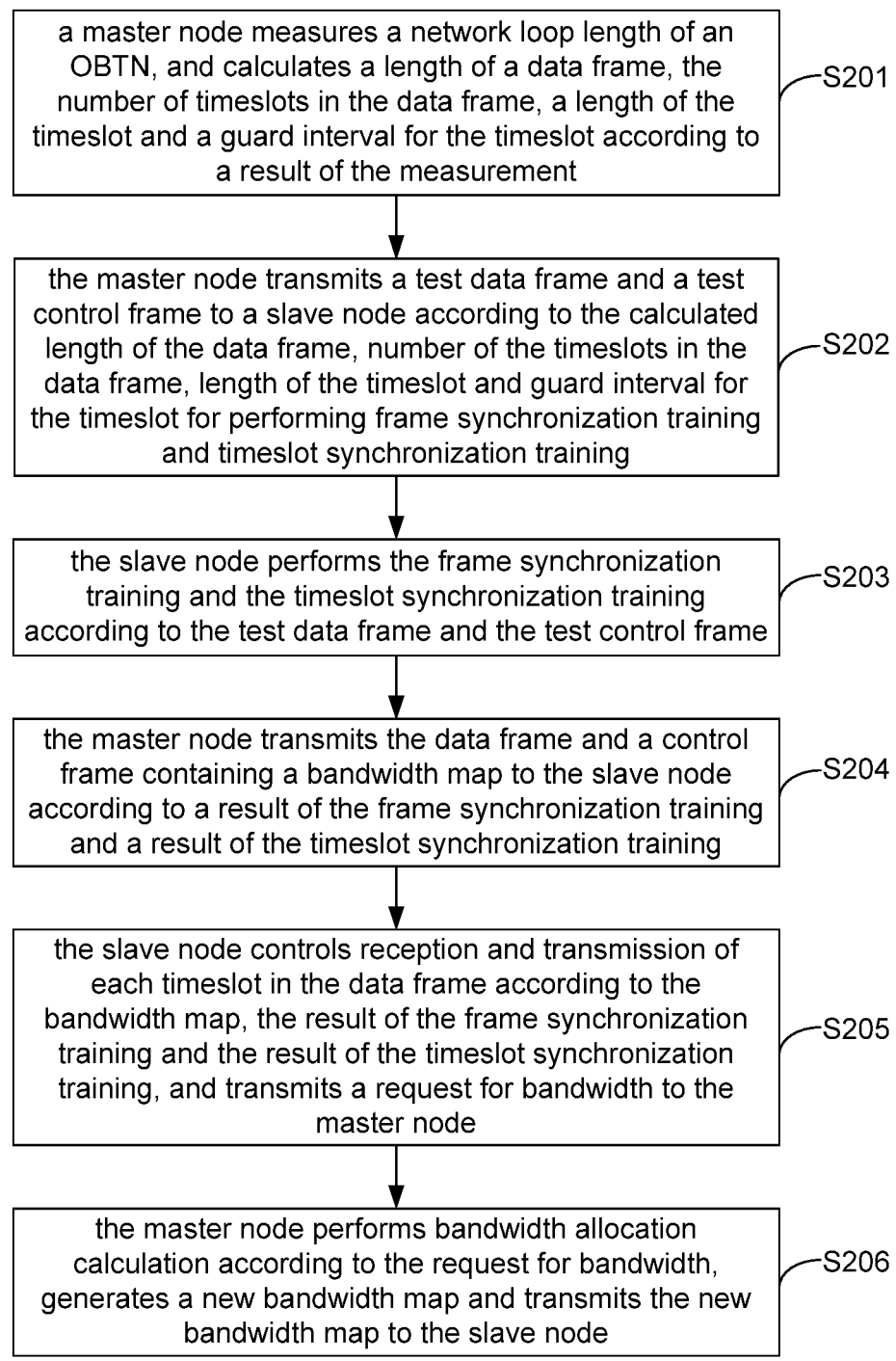
FIG. 2 is a schematic flowchart of a transmission method for an OBTN according to an embodiment of the disclosure.

FIG. 2 is a schematic flowchart of a transmission method for an OBTN according to an embodiment of the disclosure, and as shown in FIG. 2, the transmission method for the OBTN in the embodiment of the disclosure includes the following steps.

Step 201: a master node measures a network loop length of the OBTN, and calculates a length of a data frame, the number of timeslots in the data frame, a length of the timeslot and a guard interval for the timeslot according to a result of the measurement.

In an example, the step may be performed during initialization of the OBTN, and specifically, the step that the master node measures the network loop length of the OBTN may include that: a loop length of a control channel of the OBTN and a loop length of a data channel of the OBTN are measured.

The step that the loop length of the data channel of the OBTN is measured may include that:

a certain node (such as the master node or a slave node) is caused to transmit an OB packet to the master node, and the master node waits for successively receiving the OB packet twice; and time $t_1$ when the OB packet reaches the master node for the first time and time $t_2$ when the OB packet reaches the master node for the second time are measured respectively, and then the loop length of the data channel is a first time difference $t_{L1}$ between $t_1$ and $t_2$, i.e. $t_{L1}=t_2-t_1$.

Correspondingly, after the loop length of the data channel is obtained, the master node may calculate a length of the timeslot of an OB according to the loop length, and the length of the timeslot of the OB includes: length T of an OB packet and a guard interval $T_1$ between the OB packets. The loop length $t_{L1}$ of the data channel is an integral multiple of the length of the timeslot of the OB, i.e. $t_{L1}=(T+T_1)\times N$, wherein N represents the integral multiple, that is, the loop length of the OBTN includes totally N timeslots. The data frame also consists of timeslots of multiple OBs. Thus, in the embodiment, a data frame preferably includes timeslots of 10 OBs, and the loop length of the data channel is a length of 4 data frames, that is, N is 40.

It should be noted that, after the OBTN works normally, the master node is still required to perform detection of the loop length in real time to monitor a change in the network loop length and perform corresponding regulation so as to ensure that the loop length is an integral multiple of the length of the timeslot.

In particular, the step that the loop length of the control channel is measured may include that:

the master node transmits a header of a control frame at a certain time $t_3$, the control frame is sequentially transmitted through each node in the ring network, and then the master node receives the header of the control frame at time $t_4$, and then the loop length of the control channel is a second time difference $t_{L2}$ between $t_4$ and $t_3$, i.e. $t_{L2}=t_4-t_3$; that is, the second time difference between time when the header of the control frame is transmitted by the master node and time when the header of the control frame is received by the master node may be determined as the loop length of the control channel of the OBTN.

The control channel and the data channel are independent of each other and employ different wavelengths, continuous optical information packets instead of OB packets are transmitted in the control channel, and in the control channel, each of the slave nodes is required to perform optical-electric-optical processing and logical judgment before sequentially transmitting the optical information packets. Therefore, It will be understood that the second time difference will be greater than the first time difference.

Step 202: the master node transmits a test data frame and a test control frame to a slave node according to the calculated length of the data frame, number of the timeslots in the data frame, length of the timeslot and guard interval for the timeslot, for performing frame synchronization training and timeslot synchronization training.

In such case, the test control frame contains information about the length of the data frame, the number of the timeslots in the data frame, the length of the timeslot, the guard interval for the timeslot and the like.

Figure 3:
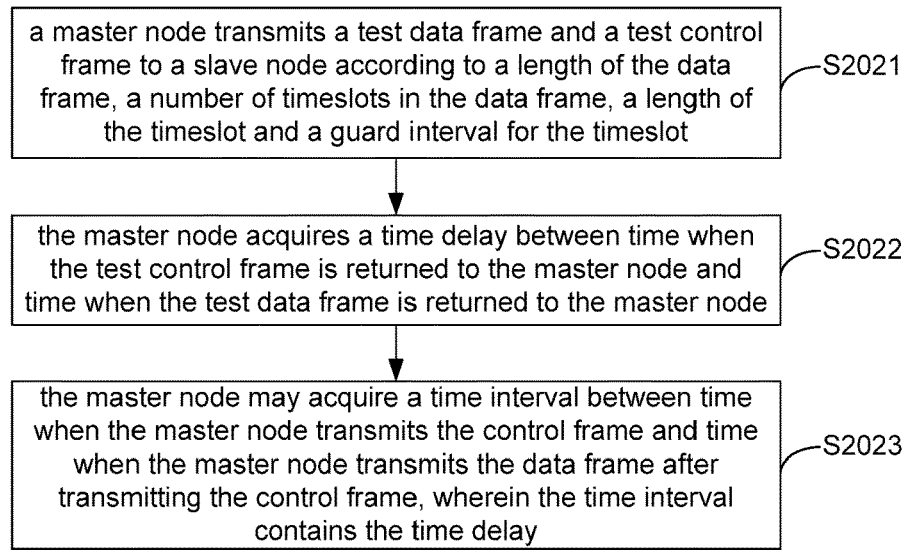
FIG. 3 is a schematic flowchart of frame synchronization training and timeslot synchronization training performed by a master node according to an embodiment of the disclosure.

In an example, FIG. 3 is a schematic flowchart of frame synchronization training and timeslot synchronization training performed by a master node according to an embodiment of the disclosure, and as shown in FIG. 3, the step may specifically include:

Step 2021: the master node transmits the test data frame and the test control frame to the slave node according to the length of the data frame, number of the timeslots in the data frame, length of the timeslot and guard interval for the timeslot.

Specifically, in the present embodiment, a length of the test data frame transmitted from Node A to node B is equal to 10 OB timeslots, and the length of each timeslot is $T+T_1$, wherein $T_1$ is the guard interval for the timeslot and T is the Length of the OB packet; and moreover, when operating normally, the master node may also transmit the data frame in such manner. In such case, a header of the data frame is virtual, and, in particular, may be a beginning of a first timeslot in the data frame.

Step 2022: the master node acquires a time delay between time when the test control frame is returned to the master node and time when the test data frame is returned to the master node.

Optionally, the master node measures the time delay between time when the test control frame is returned to the master node and time when the test data frame is returned to the master node after transmitting the test data frame and the test control frame.

Specifically, the master node may transmit the test control frame, in addition to the test data frame, the master node may measure transmission time periods between transmitting and reception of the two frames respectively, and may obtain a time difference between the two time periods for transmission. For example, the time difference may be a time delay between time when the test control frame is received and time when the test data frame is received after the master node simultaneously transmits the test data frame and test control frame which have the same length. Alternatively, the time difference may be a time difference between: a period from time when the test data frame is transmitted by the master node to time when it is received by the master node, and a period from time when the test control frame is transmitted by the master node to time when it is received by the master node, wherein the length of the test data frame is the same as that of the test control frame, and the test data frame and the test control frame are not transmitted simultaneously.

Optionally, the master node may also determine a difference value between the second time difference $t_{L2}$ and the first time difference $t_{L1}$, which are obtained in Step 201, as the time delay between time when the test control frame is returned to the master node and time when the test data frame is returned to the master node.

It should be noted that time for transmission of the test control frame in the OBTN is longer than time for transmission of the test data frame in the OBTN, because operation such as photoelectric conversion processing and logical judgment may be executed in the control channel.

Step 2023: the master node may acquire a time interval between time when the master node transmits the control frame and time when the master node transmits the data frame after transmitting the control frame, wherein the time interval includes the time delay.

Specifically, the master node may treat the time delay obtained in Step 2022 as a part of the time interval between time when the master node transmits the control frame and time when the master node transmits the data frame after transmitting the control frame. Moreover, it will be understood the time delay accounts for a great proportion of the time interval.

In addition, the time interval between time when the master node transmits the control frame and time when the master node transmits the data frame after transmitting the control frame may further include fragmentary time periods such as action time of optical switching of the nodes in the network and a time duration from starting to completion of transmission of a bandwidth map in the control frame, and then the time interval between time when the master node transmits the control frame and time when the master node transmits the data frame after transmitting the control frame is completely formed.

Step 203: the slave node performs the frame synchronization training and timeslot synchronization training according to the test data frame and the test control frame.

Figure 4:
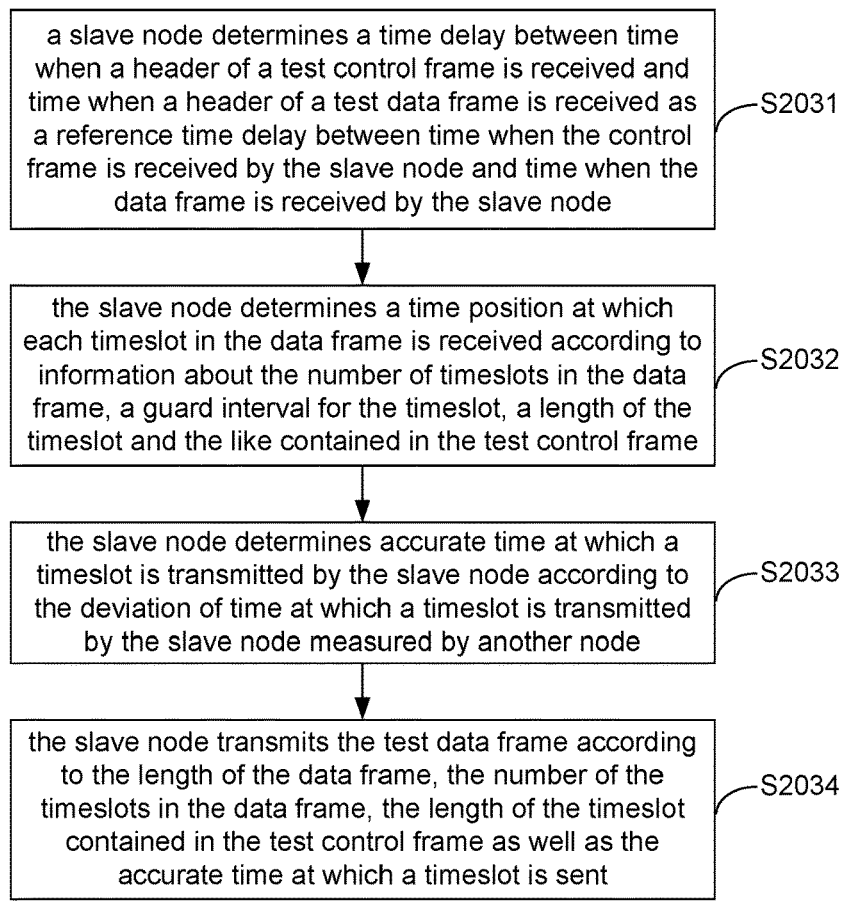
FIG. 4 is a schematic flowchart of frame synchronization training and timeslot synchronization training performed by a slave node according to an embodiment of the disclosure.

In an example, the step may also be performed in an initialization process of the OBTN. FIG. 4 is a schematic flowchart of the frame synchronization training and timeslot synchronization training performed by the slave node according to an embodiment of the disclosure, and as shown in FIG. 4, the step may specifically include the following steps.

Step 2031: the slave node determines a time delay between time when a header of the test control frame is received and time when a header (i.e. beginning of a first timeslot in the test data frame) of the test data frame is received, as a reference time delay between time when the control frame is received by the slave node and time when the data frame is received by the slave node.

In the embodiment, node B may receive the test control frame and the test data frame from the master node, i.e. node A, and determines the time delay between time when the header of the test control frame is received and time when the header of the test data frame is received, as the reference time delay between time when the control frame is received by node B and time when the data frame is received by node B during normal work; and node B forwards the test control frame to the next node C, and keeps a delay between reception and transmission of the control frame at the node at a fixed value.

Node C may also receive the test control frame forwarded by node B and the test data frame transmitted by node A, and determines a time delay between time when the header of the test control frame is received and time when the header of the test data frame is received, as a reference time delay between time when control frame is received by node C and time when the data frame is received by node C during normal work; and node C forwards the test control frame to the next node D, and keeps a delay between reception and transmission of the control frame at the node at a fixed value.

All of subsequent nodes may obtain their reference time delays between control frame reception and data frame reception during normal work in the manner adopted for node B or node C, and specific processes will not be elaborated.

Step 2032: the slave node determines a time position of each timeslot in the received data frame according to the information about the number of the timeslots in the data frame, the guard interval for the timeslot, the length of the timeslot and the like contained in the test control frame.

In the embodiment, node B may acquire the guard interval for the timeslot and the length of the timeslot from the test control frame, so that node B may calculate time of arrival of the first timeslot of the data frame according to the time delay of the control frame and the data frame when receiving the header of the control frame under a normal operating situation, and then determine the time position of each timeslot in the data frame to accurately receive each timeslot of the data frame according to the guard interval for the timeslot and the length of the timeslot. It will be understood that all of the subsequent nodes may determine the time position of each timeslot in the data frame according to the guard interval for the timeslot and length of the timeslot in the test control frame, in similar manner adopted for node B, after receiving the header of the control frame, and the process will not be elaborated herein.

Step 2033: the slave node determines accurate time at which a timeslot is transmitted by the slave node according to the deviation of time, at which a timeslot is transmitted by the slave node, measured by another node.

Since there may exist a certain delay during processing in a node when the node transmits a data timeslot, transmitting the timeslot according to time when the timeslot is received by the slave node may produce a deviation with respect to time when the timeslot is transmitted by the master node.

Specifically, in the embodiment, when node B transmits a burst timeslot of the test data frame to node C, a substantial time position $T_{bin}$ at which a certain timeslot in a certain data frame is transmitted may be different from an ideal time position at which the timeslot is transmitted (a current time position $T_{ain}$ at which the timeslot is transmitted by node A), node C may measure a deviation $T_{ain}-T_{bin}$ of time position at which the timeslot is transmitted by node B and report the deviation to node A, then node A feeds back the deviation $T_{ain}-T_{bin}$ to node B through the control frame, and node B may regulate an accurate time position at which each timeslot of the data frame is transmitted by node B according to the deviation between $T_{bin}$ and $T_{bin}$ such that the node B can transmit the burst timeslot at the accurate time position under the normal operating situation.

Each of the subsequent nodes may obtain accurate time position at which each timeslot in the data frame is transmitted by the node during normal work in a manner adopted for node B, and the process will not be elaborated herein.

Step 2034: the slave node transmits the test data frame according to the length of the data frame, the number of the timeslots in the data frame, and the length of the timeslot contained in the test control frame as well as the accurate time at which a timeslot is transmitted.

Specifically, by performing Step 2031 to Step 2034, the slave node may implement data frame synchronization training, and timeslot reception and transmission synchronization training by using the frames transmitted by the master node, and subsequently may normally implement OB-packet-based synchronous timeslot transmission according to results of training.

Step 204: the master node transmits the data frame and a control frame containing a bandwidth map to the slave node according to a result of the frame synchronization training and a result of the timeslot synchronization training.

In an example, the OBTN may work normally after the initialization process of the OBTN, i.e. Step 201 to Step 203. When the OBTN works normally, the master node may transmit the data frame and the control frame to a downstream node in the OBTN. In the embodiment, the downstream node of master node A is slave node B, and node A transmits the data frame and the control frame to node B. The control frame contains the bandwidth map generated by node A, indicating the slave node to control reception and transmission of the data frame. For example, the bandwidth map may indicate that each node may and/or may not receive a certain or some timeslots in a certain or some wavelengths in the data frame, the slave node may and/or may not write data into a certain or some timeslots in a certain or some wavelengths in the data frame and the like, which timeslots may be received by the slave nodes or into which timeslots may be written by the slave nodes, or information about bandwidths which are allocated to the slave nodes by the master node.

Step 205: the slave node controls reception and transmission of each timeslot in the data frame according to the bandwidth map, the result of the frame synchronization training and the result of the timeslot synchronization training, and transmits a request for bandwidth to the master node.

In an example, after receiving the header of the control frame, the slave node may receive the data frame after the reference time delay from the time when receiving the header of the control frame according to the reference time delay obtained in Step 203, and may also accurately receive each timeslot of the data frame at the accurate time positions according to the length of the data frame, the number of the timeslots in the data frame, the length of the timeslot and the guard interval for the timeslot which are contained in the test control frame obtained in Step 203.

During the reference time delay starting from time when the control frame is received, the slave node may read control information from the control frame, for example, reading the bandwidth map from the control frame, and under the indication of the bandwidth map, determine which timeslots in the data frame will be received by the slave node and into which timeslots, data to be transmitted may be written, thereby implementing control over reception and transmission of the data frame.

Furthermore, the bandwidth map further indicates information about the bandwidth allocated to the slave node by the master node, so that the slave node may transmit the request for bandwidth, which is based on the current traffic distribution of the slave node, to the master node to request the master node to provide a higher or more proper bandwidth when transmitting the data frame next time or next few times.

Figure 5:
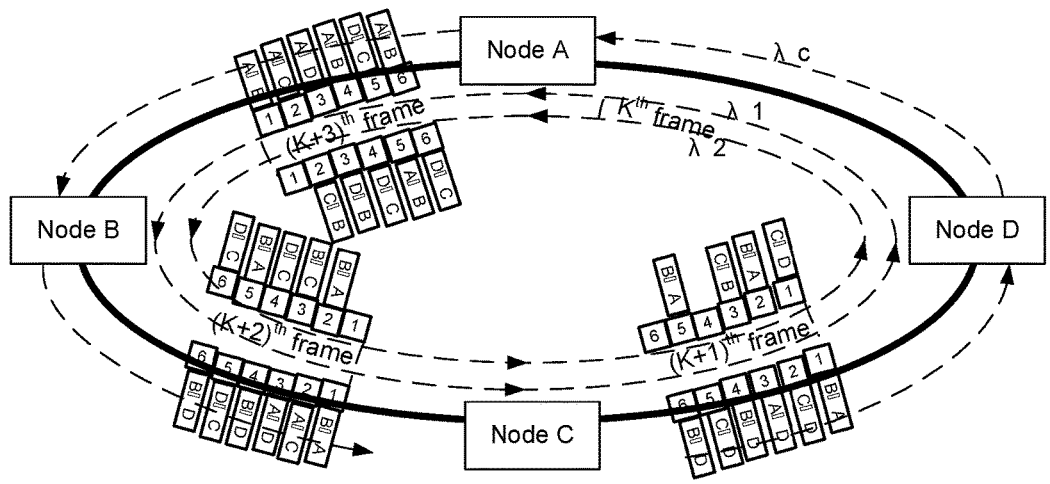
FIG. 5 is a schematic diagram of transmission of a data frame in an OBTN according to an embodiment of the disclosure.

Specifically, FIG. 5 is a schematic diagram of a data frame transmission situation in an OBTN according to an embodiment of the disclosure; and according to the data frame transmission situation shown in FIG. 5, the number of OB timeslots in the data frame is 10, and in order to facilitate description, only the first 6 timeslots are illustrated for description for node B and node C in FIG. 5, wherein K represents a sequence number of a frame.

For node B, timeslots 1, 4 and 6 in a data frame transmitted through a data channel with the wavelength $\lambda 1$ in the $(K+3)^{th}$ frame are timeslots which are transmitted from node A and will be received by node B; timeslots 2, 3 and 5 in a data frame transmitted through a data channel with the wavelength $\lambda 2$ in the $(K+3)^{th}$ frame are timeslots which are transmitted from node C, node D and node A respectively and will be received by node B; thus, the bandwidth map generated by the master node A may indicate node B to receive timeslots 1, 4 and 6 in the data frame transmitted through the data channel with the wavelength $\lambda 1$ and timeslots 2, 3 and 5 in the data frame transmitted through the data channel with the wavelength $\lambda 2$.

After the $(K+3)^{th}$ frame is transmitted through node B, a service situation of each timeslot is shown in a distribution on the $(K+2)^{th}$ frame in FIG. 5. Node B may write the data to be transmitted into the timeslots in the data frame after receiving the data transmitted to node B in the timeslots, and the bandwidth map may also indicate sequence numbers of timeslots into which data may be written by node B; for example, node B fills data to be transmitted to node A into timeslot 1 in the data frame transmitted through the data channel with the wavelength $\lambda 1$ and timeslots 2 and 5 in the data frame transmitted through the data channel with the wavelength $\lambda 2$, fills data to be transmitted to node D into timeslots 4 and 6 in the data frame transmitted through the data channel with the wavelength $\lambda 1$ and fills data to be transmitted to node C into timeslot 3 in the data frame transmitted through the data channel with the wavelength $\lambda 2$.

Data frame reception and transmission of node B shows that node A allocates 6 reception and transmission timeslots to node B, and node B may transmit a request for bandwidth based on its own resource to node A to request for a higher or more proper bandwidth or a more proper inter-node pair bandwidth.

For node C, timeslots 2 and 5 in the data frame transmitted through the data channel with the wavelength $\lambda 1$ in the $(K+2)^{th}$ frame are timeslots which are transmitted from nodes A and D respectively and will be received by node C. Timeslots 3, 4 and 6 in the data frame transmitted through the data channel with the wavelength $\lambda 2$ are timeslots which will be received by node C; thus, the bandwidth map generated by the master node A may indicate node C to receive timeslots 2 and 5 in the data frame transmitted through the data channel with the wavelength $\lambda 1$ and timeslots 3, 4 and 6 in the data frame transmitted through the data channel with the wavelength $\lambda 2$.

After the $(K+2)^{th}$ frame is transmitted through node C, a service situation of each timeslot is shown in a distribution on the $(K+1)^{th}$ frame. Node C may write data to be transmitted into the timeslots in the data frame after receiving the data in the timeslots, and the bandwidth map may also indicate sequence numbers of timeslots into which data may be written by node C. For example, node C fills data to be transmitted to node D into timeslots 2 and 5 in the data frame transmitted through the data channel with the wavelength $\lambda 1$ and timeslot 1 in the data frame transmitted through the data channel with the wavelength $\lambda 2$, and fills data to be transmitted to node B into timeslot 3 in the data frame transmitted through the data channel with the wavelength $\lambda 2$.

Similarly, node C may also transmit a request for bandwidth to node A to request for a higher or more proper bandwidth.

The process that node D controls reception and transmission of the data frame and transmits a request for bandwidth to the master node is the same as those of node B and node C, and will not be elaborated herein.

It should be noted that timeslot reusability is higher in the embodiment of the disclosure and a node may transmit data by using a timeslot after the same timeslot is received by the nodes in downstream, so that a transmission rate of the network is increased, and throughput of the network is improved.

Step 206: the master node performs bandwidth allocation calculation according to the request for bandwidth, generates a new bandwidth map and transmits the new bandwidth map to the slave node.

In an example, in the embodiment, after receiving the requests for bandwidth from respective slave nodes, node A may perform wavelength and timeslot allocation for each node to generate the new bandwidth map by virtue of a Dynamic Bandwidth Allocation (DBA) algorithm according to a current state of resources of the whole network and the requests for bandwidth of respective slave nodes.

The embodiment of the disclosure provides the transmission method for the OBTN, in which, by means of network loop length detection of the master node and frame synchronization and timeslot synchronization training of the nodes in the network, FDL is not required in the nodes in the network, a network design is simplified, construction cost of the OBTN is lowered, flexible construction of the OBTN is implemented without greatly limiting the throughput of the network, increase of an operation rate of the network and improvement of efficiency and throughput of the network are facilitated, and an effective rate of an optical network is fully utilized.

Figure 6:
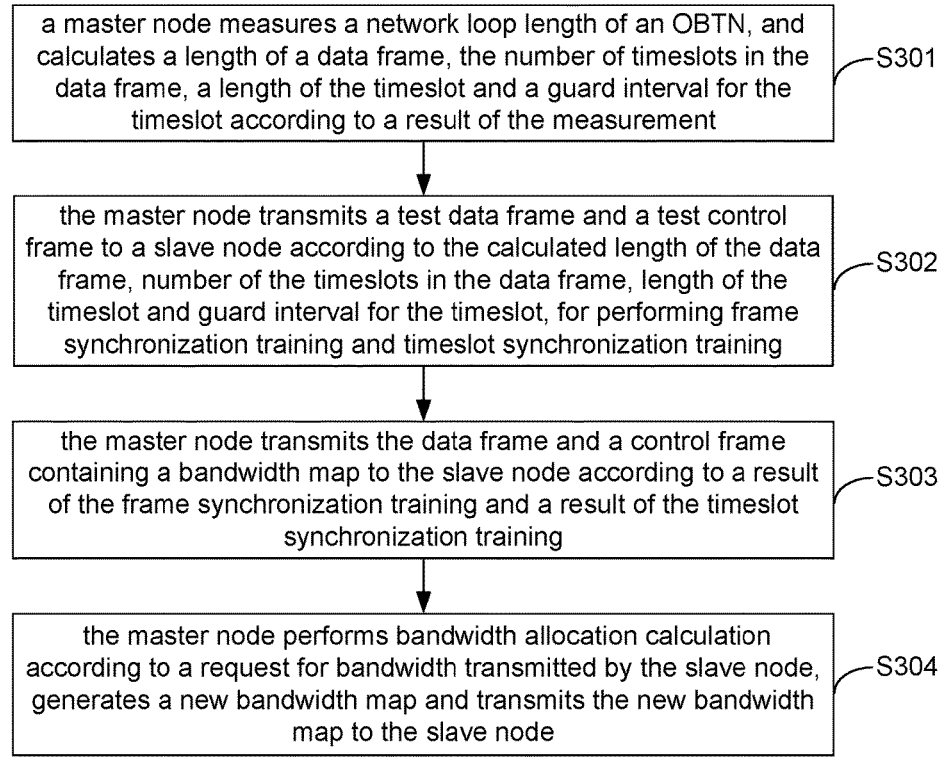
FIG. 6 is a schematic flowchart of another transmission method for an OBTN according to an embodiment of the disclosure.

FIG. 6 is a schematic flowchart of another transmission method for an OBTN according to an embodiment of the disclosure, the method is applied to a master node, and as shown in FIG. 6, the transmission method for the OBTN in the embodiment of the disclosure includes the following steps.

Step 301: the master node measures a network loop length of the OBTN, and calculates a length of a data frame, the number of timeslots in the data frame, a length of the timeslot and a guard interval for the timeslot according to a result of the measurement.

In an example, the step may be performed during initialization of the OBTN, and specifically, the step that the master node measures the network loop length of the OBTN may include that: a loop length of a control channel of the OBTN and a loop length of a data channel of the OBTN are measured.

In such case, the step that the loop length of the data channel of the OBTN is measured may include that:

a certain node (such as the master node and a slave node) is caused to transmit an OB packet to the master node, and the master node waits for successively receiving the OB packet twice; and time $t_1$ when the OB packet reaches the master node for the first time and time $t_2$ when the OB packet reaches the master node for the second time is measured respectively, and then the loop length of the data channel is a first time difference $t_{L1}$ between $t_1$ and $t_2$, i.e. $t_{L1}=t_2-t_1$.

Correspondingly, after the loop length of the data channel is obtained, the master node may calculate a length of the timeslot of an OB according to the loop length, and the length of the timeslot of the OB includes: a length T of the OB packet and a guard interval $T_1$ between OB packets. The loop length $t_{L1}$ of the data channel is an integral multiple of the length of the timeslot of the OB, i.e. $t_{L1}=(T+T_1)\times N$, wherein N represents the integral multiple, that is, the loop length of the OBTN includes totally N timeslots. The data frame also consists of timeslots of multiple OBs. Thus, in the embodiment, a data frame preferably includes timeslots of 10 OBs, and the loop length of the data channel is a length of 4 data frames, that is, N is 40.

It should be noted that the master node is still required to perform loop length detection in real time to monitor a change in the network loop length and perform corresponding regulation to ensure that the loop length is an integral multiple of the length of the timeslot after the OBTN works normally.

The step that the loop length of the control channel is measured may include the following steps.

The master node transmits a header of a control frame at a certain time $t_3$, and after the control frame is sequentially transmitted through each node in the ring network, the master node receives the header of the control frame at time $t_4$, and then the loop length of the control channel is a second time difference $t_{L2}$ between $t_4$ and $t_3$, i.e. $t_{L2}=t_4-t_3$; that is, the second time difference between time when the header of the control frame transmitted by the master node and time when the header of the control frame received by the master node may be determined as the loop length of the control channel of the OBTN.

Since the control channel and the data channel are independent of each other and use different wavelengths, successive optical information packets, instead of the OB packets, are transmitted via the control channel and optical-electric-optical processing and logical judgment are required before sequential transmission at each slave node in the control channel, it will be understood that the second time difference should be greater than the first time difference.

Step 302: the master node transmits a test data frame and a test control frame to a slave node according to the calculated length of the data frame, the number of the timeslots in the data frame, the length of the timeslot and the guard interval for the timeslot, for performing frame synchronization training and timeslot synchronization training.

Here, the step that the master node transmits the test data frame and the test control frame to the slave node according to the calculated length of the data frame, the number of the timeslots in the data frame, the length of the timeslot and the guard interval for the timeslot, for performing frame synchronization training and timeslot synchronization training includes that:

the master node transmits the test data frame and the test control frame to the slave node according to the calculated length of the data frame, number of the timeslots in the data frame, length of the timeslot and guard interval for the timeslot, the test control frame contains information about the length of the data frame, the number of the timeslots in the data frame, the length of the timeslot and the guard interval for the timeslot;

a time delay between time when the test control frame is returned to the master node and time when the test data frame is returned to the master node is acquired; and a time interval between time when the master node transmits the control frame and time when the master node transmits the data frame after transmitting the control frame is acquired, wherein the time delay is contained in the time interval.

Specifically, the time delay between time when the test control frame is returned to the master node and time when the test data frame is returned to the master node is acquired includes that:

the master node transmits the test data frame and the test control frame, and then measures the time delay between time when the test control frame is returned to the master node and time when the test data frame is returned to the master node;

alternatively, a difference value between the second time difference and the first time difference is determined as the time delay between time when the test control frame is returned to the master node and time when the test data frame is returned to the master node.

Step 303: the master node transmits the data frame and a control frame containing a bandwidth map to the slave node according to a result of the frame synchronization training and a result of the timeslot synchronization training.

In an example, when the OBTN works normally, the master node may transmit the data frame and the control frame to a downstream node in the OBTN, and in the embodiment, the downstream node of master node A is slave node B, node A transmits the data frame and the control frame to node B. The control frame contains the bandwidth map which is generated by node A, indicating the slave node to control reception and transmission of the data frame. For example, the bandwidth map may indicate that each node may and/or may not receive a certain or some timeslots in a certain or some wavelengths in the data frame, the slave node may and/or may not write data into a certain or some timeslots in a certain or some wavelengths in the data frame and the like, which timeslots may be received by the slave nodes or into which timeslots may be written by the slave nodes, or information about bandwidths which are allocated to the slave nodes by the master node.

Step 304: the master node performs bandwidth allocation calculation according to a request for bandwidth transmitted by the slave node, generates a new bandwidth map and transmits the new bandwidth map to the slave node.

In an example, in the embodiment, after receiving the requests for bandwidth from respective slave nodes, node A may perform wavelength and timeslot allocation for each node to generate the new bandwidth map by virtue of a DBA algorithm according to a current state of resources of the whole network and requests for bandwidth of respective slave nodes.

The embodiment of the disclosure further provides a computer storage medium having stored therein computer-executable instructions for executing the transmission method, applied to the master node, for the OBTN in the embodiment of the disclosure.

Figure 7:
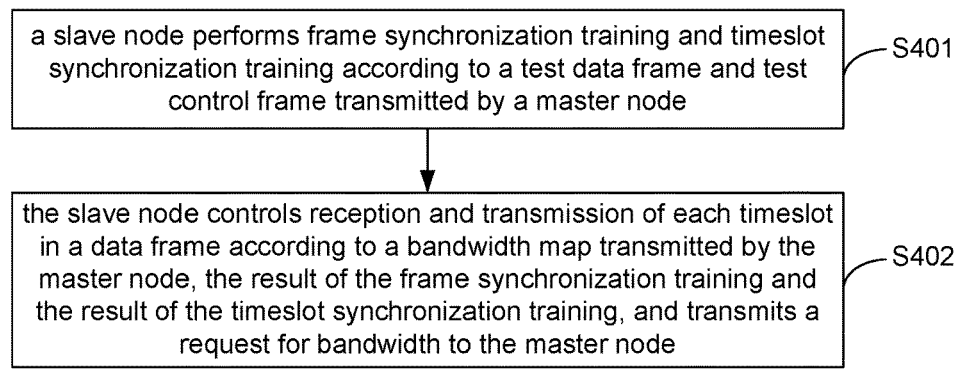
FIG. 7 is a schematic flowchart of yet another transmission method for an OBTN according to an embodiment of the disclosure.

FIG. 7 is a schematic flowchart of yet another transmission method for an OBTN according to an embodiment of the disclosure, the method is applied to a slave node, and as shown in FIG. 7, the transmission method for the OBTN in the embodiment of the disclosure includes the following steps.

Step 401: the slave node performs frame synchronization training and timeslot synchronization training according to a test data frame and test control frame transmitted by a master node, and transmits a result of the frame synchronization training and a result of the timeslot synchronization training to the master node.

In an example, the step that the slave node performs the frame synchronization training and timeslot synchronization training according to the test data frame and the test control frame includes that:

the slave node determines a time delay between time when a header of the test control frame is received and time when a beginning of a first timeslot in the test data frame is received, as a reference time delay between time when a control frame is received by the slave node and time when the data frame is received by the slave node;

the slave node determines a time position of each timeslot in the data frame according to the number of timeslots in the data frame, a guard interval for the timeslot and a length of the timeslot which are contained in the test control frame;

the slave node determines accurate time at which a timeslot is transmitted by the slave node according to the deviation of time, at which a timeslot is transmitted by the slave node, measured by another node; and the slave node transmits the test data frame according to the length of the data frame, the number of the timeslots in the data frame and the length of the timeslot contained in the test control frame as well as the accurate time at which a timeslot is transmitted.

Step 402: the slave node controls reception and transmission of each timeslot in a data frame according to a bandwidth map transmitted by the master node, the result of the frame synchronization training and the result of the timeslot synchronization training, and transmits a request for bandwidth to the master node.

In an example, after receiving the header of the control frame, the slave node may receive the data frame after the reference time delay from time when receiving the header of the control frame according to the obtained reference time delay, and may also accurately receive each timeslot of the data frame at the accurate time positions according to the length of the data frame, the number of the timeslots in the data frame, the length of the timeslot and the guard interval for the timeslot which are contained in the test control frame.

During the reference time delay from time when the control frame is received, the slave node may read control information from the control frame, for example, reading the bandwidth map from the control frame, and under the indication of the bandwidth, determine which timeslots in the data frame will be received by the slave node and into which timeslots, data to be transmitted may be written, thereby implementing control over reception and transmission of the data frame.

Furthermore, the bandwidth map further indicates information about the bandwidth allocated to the slave node by the master node, so that the slave node may transmit the request for bandwidth, which is based on the current traffic distribution of the slave node, to the master node to request the master node to provide a higher or more proper bandwidth when transmitting the data frame next time or next few times.

The embodiment of the disclosure further provides a computer storage medium having stored therein computer-executable instructions for executing the transmission method, applied to the master node, for the OBTN in the embodiment of the disclosure.

Figure 8:
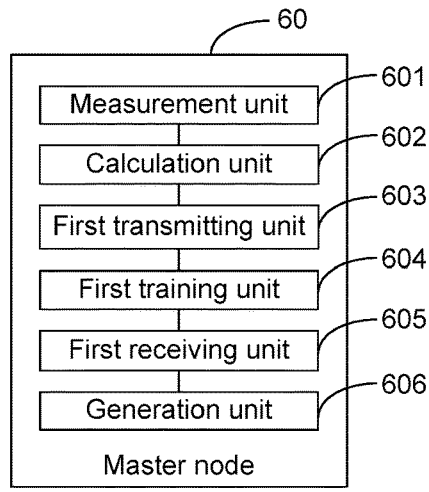
FIG. 8 is a schematic diagram of structure of a master node according to an embodiment of the disclosure.

Referring to FIG. 8, the embodiment of the disclosure provides a master node 60, which may be applied to an OBTN. In order to clearly describe the embodiment of the disclosure, a structure of the OBTN is shown in FIG. 1, and the master node 60 may include a measurement unit 601, a calculation unit 602, a first transmitting unit 603, a first training unit 604, a first receiving unit 605 and a generation unit 606.

The measurement unit 601 may be configured to measure a network loop length of the OBTN, wherein the network loop length may include a loop length of a data channel of the OBTN and a loop length of a control channel of the OBTN;

The calculation unit 602 may be configured to calculate a length of a data frame, a length of the timeslot, the number of timeslots in the data frame, a guard interval for the timeslot and the like according to the loop length of the data channel in a result of the measurement of the measurement unit 601;

The first transmitting unit 603 may be configured to transmit a test data frame and a test control frame to a slave node according to the calculated length of the data frame, number of the timeslots in the data frame, length of the timeslot and guard interval for the timeslot.

In such case, the test control frame contains the length of the data frame, the number of the timeslots in the data frame, the length of the timeslot and the guard interval for the timeslot.

The first training unit 604 may be configured to perform frame synchronization training and timeslot synchronization training according to the test data frame and test control frame transmitted by the first transmitting unit 603.

The first transmitting unit 603 may be further configured to transmit the data frame and a control frame containing a bandwidth map according to results of the frame synchronization training and timeslot synchronization training performed by the first training unit 604;

The first receiving unit 605 may be configured to receive a request for bandwidth.

The generation unit 606 may be configured to perform bandwidth allocation calculation according to the request for bandwidth, and generate a new bandwidth map.

The first transmitting unit 603 may be further configured to transmit the new bandwidth map.

In an example, the measurement unit 601 may measure the network loop length of the OBTN during initialization of the OBTN, and specifically, the measurement unit 601 may measure a loop length of a control channel of the OBTN and a loop length of a data channel of the OBTN.

In such case, the step that the measurement unit 601 measures the loop length of the data channel of the OBTN may include that:

a certain node (such as the master node and a slave node) is caused to transmit an OB packet to the master node 60, and the measurement unit 601 waits for successively receiving the OB packet twice; and the measurement unit 601 measures time $t_1$ when the OB packet reaches the master node 60 for the first time and time $t_1$ when the OB packet reaches the master node 60 for the second time respectively, and then the loop length of the data channel is a first time difference $t_{L1}$ of $t_1$ and $t_2$, i.e. $t_{L1}=t_2-t_1$.

Correspondingly, after the loop length of the data channel is obtained, the calculation unit 602 may calculate a length of the timeslot of an OB according to the loop length, and the length of the timeslot of the OB includes: a length T of the OB packet and a guard interval $T_1$ between OB packets. The loop length $t_{L1}$ of the data channel is an integral multiple of the length of the timeslot of the OB, i.e. $t_{L1}=(T+T_1)\times N$, wherein N represents the integral multiple, that is, the loop length of the OBTN includes totally N timeslots. The data frame also consists of timeslots of multiple OBs. Thus, in the embodiment, a data frame preferably includes timeslots of 10 OBs, and the loop length of the data channel is a length of 4 data frames, that is, N is 40.

It should be noted that the master node 60 is still required to perform loop length detection in real time to monitor a change in the network loop length and perform corresponding regulation to ensure that the loop length is an integral multiple of the length of the timeslot after the OBTN works normally.

The step that the measurement unit 601 measures the loop length of the control channel may include that:

the master node 60 transmits a header of a control frame at a certain time $t_3$, and after the control frame is sequentially transmitted through each node in the ring network, the measurement unit 601 receives the header of the control frame at time $t_4$, and then the loop length of the control channel is a second time difference $t_{L2}$ between $t_4$ and $t_3$, i.e. $t_{L2}=t_4-t_3$.

Since the control channel and the data channel are independent of each other and use different wavelengths, successive optical information packets, instead of OB packets, are transmitted via the control channel and optical-electric-optical processing and logical judgment are required before sequential transmission at each slave node in the control channel, It will be understood that the second time difference should be greater than the first time difference.

In an example, the first transmitting unit 603 is configured to transmit the test data frame to the slave node according to the length of the data frame, the number of the timeslots in the data frame, the length of the timeslot and the guard interval for the timeslot. Specifically, a length of the test data frame transmitted by the first transmitting unit 603 may be equal to 10 OB timeslots, and the length of each timeslot is $T+T_1$, wherein $T_1$ is the guard interval for the timeslot and T is the length of the OB packet; and moreover, the first transmitting unit 603 may also transmit the data frame when operating normally. It will be understood that a header of the data frame is virtual, and may specifically be the beginning of the first timeslot in the data frame.

The first training unit 604 is configured to measure the time delay between time when the test control frame is returned to the master node and time when the test data frame is returned to the master node after the first transmitting unit 603 transmits the test data frame and the test control frame.

Alternatively, the first training unit 604 determine a difference value between $t_{L2}$ and $t_{L1}$ obtained by the measurement unit 601 as the time delay between time when the test control frame is returned to the master node and time when the test data frame is returned to the master node.

Specifically, after the first transmitting unit 603 transmits the test data frame and the test control frame, the first training unit 604 measures transmission time periods between transmitting and reception of the two frames respectively, and may obtain a time difference between the two transmission time periods. For example, the time difference may be a time delay between time when the test control frame is received and time when the test data frame is received, calculated by the first training unit 604 after the first transmitting unit 603 simultaneously transmits the test data frame and test control frame which have the same length. Alternatively, the time difference may be a time difference between: a period from time when the test data frame is transmitted by the first transmitting unit 604 to time when it is received, and a period from time when the test control frame is transmitted by the first transmitting node 604 to time when it is received, wherein the length of the test data frame is the same as that of the test control frame, and the test data frame and the test control frame are not transmitted simultaneously.

It should be noted that time for transmission of the test control frame in the OBTN is longer than time for transmission of the test data frame in the OBTN, because operation such as photoelectric conversion processing and logical judgment may be executed in the control channel.

Specifically, the time delay may be treated as a part of the time interval between time when the master node transmits the control frame and time when the master node transmits the data frame after transmitting the control frame. Moreover, it will be understood the time delay accounts for a great proportion of the time interval.

In addition, the time interval between time when the master node transmits the control frame and time when the master node transmits the data frame after transmitting the control frame may further include fragmentary time periods such as action time of optical switching of the nodes in the network and a time duration from starting to completion of transmission of a bandwidth map in the control frame, and then the time interval between time when the master node transmits the control frame and time when the master node transmits the data frame after transmitting the control frame is completely formed.

In an example, the OBTN may work normally after an initialization process of the OBTN; and when the OBTN works normally, the first transmitting unit 603 may transmit the data frame and the control frame to a downstream node in the OBTN. In the embodiment, the downstream node of master node A is slave node B, and node A transmits the data frame and the control frame to node B. The control frame contains the bandwidth map generated by the generation unit 606, indicating the slave node to control reception and transmission of the data frame. For example, the bandwidth map may indicate that each node may and/or may not receive a certain or some timeslots in a certain or some wavelengths in the data frame, the slave node may and/or may not write data into a certain or some timeslots in a certain or some wavelengths in the data frame and the like, which timeslots may be received by the slave nodes or into which timeslots may be written by the slave nodes, or information about bandwidths which are allocated to the slave nodes by the master node 60.

In an example, in the embodiment, after the first receiving unit 605 receives the requests for bandwidth from respective slave nodes, the generation unit 606 may perform bandwidth allocation calculation according to a current state of resources of the whole network and requests for bandwidth of respective slave nodes and perform wavelength and timeslot allocation for the respective nodes to generate the new bandwidth map by virtue of a DBA algorithm.

The embodiment of the disclosure provides the master node 60, and by means of network loop length detection of the master node 60 and frame synchronization training and timeslot synchronization training of the nodes in the network, FDL is not required in the nodes in the network, a network design is simplified, construction cost of the OBTN is lowered, flexible construction of the OBTN is implemented without greatly limiting the throughput of the network, increase of an operation rate of the network and improvement of efficiency and throughput of the network are facilitated, and an effective rate of an optical network is fully utilized.

In the embodiment of the disclosure, in a practical application, the measurement unit 601, calculation unit 602, first training unit 604 and generation unit 606 in the master node 60 may be implemented in a Central Processing Unit (CPU), Digital Signal Processor (DSP) or Field Programmable Gate Array (FPGA) in the master node 60; the first transmitting unit 603 in the master node 60 may be implemented by a transmitter or transmission antenna in the master node 60 in the practical application; and the first receiving unit 605 in the master node 60 may be implemented by a receiver or receiving antenna in the master node 60 in the practical application.

Figure 9:
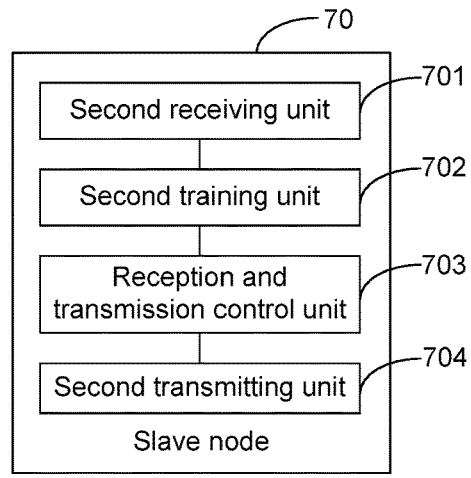
FIG. 9 is a schematic diagram of structure of a slave node according to an embodiment of the disclosure.

Referring to FIG. 9, the embodiment of the disclosure provides a slave node 70, which may be applied to an OBTN, and in order to clearly describe the embodiment of the disclosure, a structure of the OBTN is shown in FIG. 1, and the slave node 70 may include a second receiving unit 701, a second training unit 702, a reception and transmission control unit 703 and a second transmitting unit 704.

The second receiving unit 701 may be configured to receive a test data frame and a test control frame.

The second training unit 702 may be configured to perform frame synchronization training and timeslot synchronization training according to the test data frame and test control frame received by the second receiving unit 701.

The second receiving unit 701 may be further configured to receive a data frame and a control frame containing a bandwidth map.

The reception and transmission control unit 703 may be configured to control reception and transmission of each timeslot in the data frame according to the bandwidth map received by the second receiving unit 701, a result of the frame synchronization training and a result of the timeslot synchronization training.

The second transmitting unit 704 may be configured to transmit a request for bandwidth.

The second receiving unit 701 may be further configured to receive a new bandwidth map.

In an example, the second training unit 702 may be configured to determine a time delay between time when a header of the test control frame is received and time when a header of the test data frame (i.e. a beginning of a first timeslot in the frame) is received as a reference time delay between time when the control frame is received by the slave node and time when the data frame is received by the slave node.

In the example, a time position at which each timeslot in the data frame is received is determined according to information about the number of timeslots in data frame, a guard interval for the timeslot and a length of the timeslot which are contained in the test control frame, wherein the second training unit 702 may acquire the guard interval for the timeslot and the length of the timeslot from the test control frame in the embodiment, so that the slave node 70 may calculate time of arrival of the first timeslot of the data frame according to the time delay between the control frame and the data frame when receiving the header of the control frame under a normal operating situation, and then determine the time position of each timeslot in the data frame to accurately receive each timeslot of the data frame according to the guard interval for the timeslot and the length of the timeslot.

In the example, accurate time at which a timeslot is transmitted by a node is determined according to the deviation of time, at which a timeslot is transmitted by the node, measured by another node. In the embodiment, when node B, for example, transmits a burst timeslot of the test data frame to node C, the burst timeslot containing information about a data frame No., a timeslot No., a source node and destination node of the transmission and the like, a substantial position $T_{bin}$ where a certain timeslot in a certain data frame is transmitted may be different from an ideal timeslot position (a current time position $T_{ain}$ at which the timeslot is transmitted by node A), node C may measure a deviation $T_{ain}-T_{bin}$ of the timeslot transmitted by node B and report the deviation to node A, then node A feeds back the deviation $T_{ain}-T_{bin}$ to node B through the control frame, and node B may regulate an accurate time position at which each timeslot of the data frame is transmitted by node B according to the deviation between $T_{bin}$ and $T_{ain}$ so as to transmit the burst timeslot at the accurate time position at which a timeslot is transmitted under the normal operating situation.

The timeslot of the test data frame is transmitted according to the length of the data frame, the number of the timeslots in the data frame, the length of the timeslot and the guard interval for the timeslot, which are contained in the test control frame, as well as the accurate time at which a timeslot is transmitted. After performing the frame synchronization and timeslot synchronization training in the embodiment, the slave node may transmit the test data frame and the test control frame to the next node in the OBTN to enable the next node to implement frame synchronization and timeslot synchronization training according to the length of the data frame, the number of the timeslots in the data frame, the length of the timeslot and the guard interval for the timeslot contained in the test control frame, as well as the results of training, and the regulated accurate time at which a timeslot is transmitted.

In an example, in a normal operating state of the OBTN, the second receiving unit 701 may determine the beginning of the first timeslot in the data frame after the reference time delay from when receiving the header of the control frame according to the reference time delay when receiving the timeslots of the data frame, and accurately receive each timeslot of the data frame at the accurate time positions according to the length of the data frame, the number of the timeslots in the data frame, the length of the timeslot and the guard interval for the timeslot contained in the current control frame.

During the reference time delay from time when the control frame is received, the slave node 70 may read control information such as bandwidth map from the control frame, and under the indication of the bandwidth map, determine which timeslots in the data frame will be received by the slave node and into which timeslots, data to be transmitted may be written by the slave node, such that the control of the reception and transmission control unit 703 can be performed on reception and transmission of each timeslot in the data frame.

Furthermore, the bandwidth map further indicates information about a bandwidth allocated to the slave node by the master node, so that the slave node 70 may transmit the request for bandwidth, which is based on its own current traffic distribution situation, to the master node through the second transmitting unit 704 to request the master node to provide a higher or more proper bandwidth when transmitting the data frame next time or next few times.

Specifically, in a data frame transmission situation shown in FIG. 5, the number of OB timeslots in the data frame is 10, and in order to facilitate description, the first 6 timeslots are illustrated for description for node B and node C in FIG. 5.

For node B, timeslots 1, 4 and 6 in a data frame transmitted through a data channel with a wavelength λ1 in the $(K+3)^{th}$ frame are timeslots which will be received by node B; timeslots 2, 3 and 5 in a data frame transmitted through a data channel with a wavelength λ2 in the $(K+3)^{th}$ frame are timeslots which will be received by node B; thus, the bandwidth map generated by the master node A may indicate the reception and transmission control unit 703 of node B to receive timeslots 1, 4 and 6 in the data frame transmitted through the data channel with the wavelength λ1 and timeslots 2, 3 and 5 in the data frame transmitted through the data channel with the wavelength.

After the $(K+3)^{th}$ frame is transmitted through node B, a service situation of each timeslot is shown in a distribution on the $(K+2)^{th}$ frame in FIG. 5. Node B may write data to be transmitted into the timeslots in the data frame after receiving the data transmitted to node B in the timeslots, and the bandwidth map may also indicate sequence numbers of timeslots into which data may be written by node B. For example, the reception and transmission control unit 703 of node B fills data to be transmitted to node A into timeslot 1 in the data frame transmitted through the data channel with the wavelength λ1 and timeslots 2 and 5 in the data frame transmitted through the data channel with the wavelength λ2, fills data to be transmitted to node D into timeslots 4 and 6 in the data frame transmitted through the data channel with the wavelength λ1 and fills data to be transmitted to node C into timeslot 3 in the data frame transmitted through the data channel with the wavelength λ2.

Data frame reception and transmission of node B shows that node A allocates 6 reception and transmission timeslots to node B, and node B may transmit a request for bandwidth, which is based on the resource situation of node B, to node A through the second transmitting unit 704 to request for a higher or more proper bandwidth or a more proper inter-node pair bandwidth.

For node C, timeslots 2 and 5 in the data frame transmitted through the data channel with the wavelength λ1 in the $(K+2)^{th}$ frame are timeslots which will be received by node C; timeslots 3, 4 and 6 in the data frame transmitted through the data channel with the wavelength λ2 are timeslots which will be received by node C; thus, the bandwidth map generated in the master node A may indicate the reception and transmission control unit 703 of node C to receive timeslots 2 and 5 in the data frame transmitted through the data channel with the wavelength λ1 and timeslots 3, 4 and 6 in the data frame transmitted through the data channel with the wavelength λ2.

After the $(K+2)^{th}$ frame is transmitted through node C, a service situation of each timeslot is shown in a distribution on the $(K+1)^{th}$ frame, node C may write data to be transmitted into the timeslots in the data frame after receiving the data in the timeslots, and the bandwidth map may also indicate sequence numbers of timeslots into which data may be written by node C; for example, the reception and transmission control unit 703 of node C fills data to be transmitted to node D into timeslots 2 and 5 in the data frame transmitted through the data channel with the wavelength λ1 and timeslot 1 in the data frame transmitted through the data channel with the wavelength λ2, and fills data to be transmitted to node B into timeslot 3 in the data frame transmitted through the data channel with the wavelength λ2.

Similarly, node C may also transmit a request for bandwidth to node A through the second transmitting unit 704, to request for a higher or more proper bandwidth.

The process that node D controls reception and transmission of the data frame and transmits a request for bandwidth to the master node is the same as those of node B and node C, and will not be elaborated herein.

It should be noted that timeslot reusability is higher in the embodiment of the disclosure and a node may transmit data with a timeslot after the same timeslot is received by another node in downstream of the node, so that a transmission rate of the network is increased.

The embodiment of the disclosure provides the slave node 70, and frame synchronization and timeslot synchronization training may be performed according to the test data frame and test control frame transmitted by the master node, so that FDL is not required in the nodes in the network, a network design is simplified, construction cost of the OBTN is lowered, flexible construction of the OBTN is implemented without greatly limiting the throughput of the network, increase of an operation rate of the network and improvement of efficiency and throughput of the network are facilitated, and an effective rate of an optical network is fully utilized.

In the embodiment of the disclosure, the second training unit 702 and reception and transmission control unit 703 in the slave node 70 may be implemented in a CPU, DSP or FPGA in the slave node 70 in a practical application; the second transmitting unit 704 in the slave node 70 may be implemented by a transmitter or transmission antenna in the slave node 70 in the practical application; and the second receiving unit 701 in the slave node 70 may be implemented by a receiver or receiving antenna in the slave node 70 in the practical application.

Figure 10:
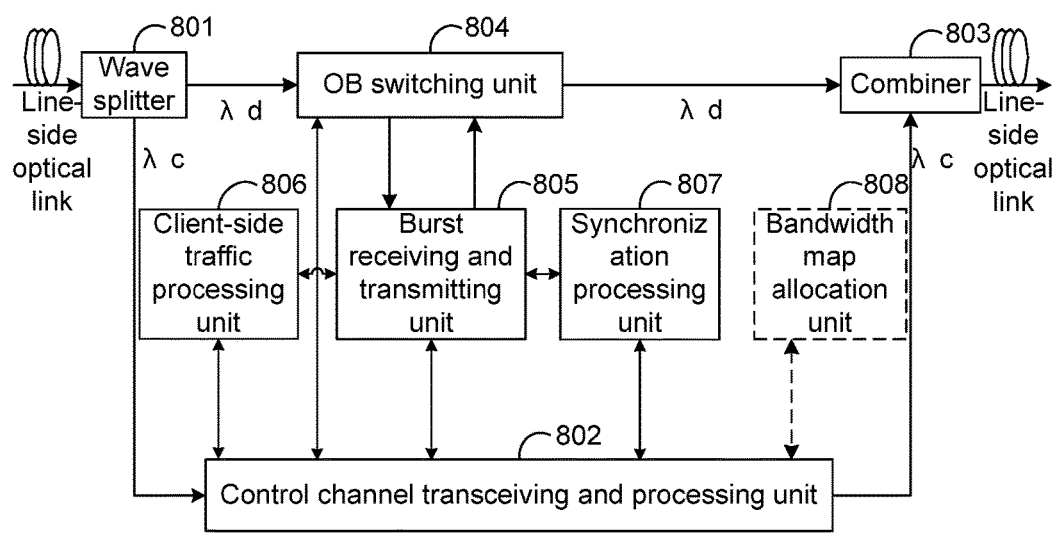
FIG. 10 is a schematic diagram of a node device according to an embodiment of the disclosure.

FIG. 10 is a schematic diagram of a node device 80 for an OBTN according to an embodiment of the disclosure, in which specific structures of the master node 60 and slave node 70 in the abovementioned embodiment may be schematically described in summary. In FIG. 10, the full thick line is an optical signal, the thin solid line is an electric signal, the dotted part is a part only existing in the master node 60, and when the dotted part is omitted, the node device 80 shown in FIG. 10 may represent the slave node 70.

The node device 80 includes a wave splitter 801, a control channel transceiving and processing unit 802, a combiner 803, an OB switching unit 804, a burst receiving and transmitting unit 805, a client-side traffic processing unit 806, a synchronization processing unit 807, a bandwidth map allocation unit 808 and the like.

The wave splitter 801 separates wavelength λc for a control channel from wavelength λd for a data channel.

The control channel transceiving and processing unit 802 is configured to receive data in the control channel wavelength, perform control on data reception and transmission according to the data, and simultaneously generate a new control frame.

The combiner 803 combines the wavelength λc for the control channel and the wavelength λd for the data channel, and outputs them as a whole to a line-side optical link for transmission.

The OB switching unit 804 implements switching of an OB packet, including uplink and downlink control and optical conduction, optical attenuation and/or optical attenuation control, to implement timeslot-based burst packet switching control for different wavelengths.

The burst receiving and transmitting unit 805 implements burst reception and burst transmitting of line-side data.

The client-side traffic processing unit 806 receives, transmits and caches data at the client-side, and performs data interaction with the burst receiving and transmitting unit 805 according to control.

The synchronization processing unit 807 realizes functions of timeslot synchronization, clock synchronization and the like for burst switching.

The bandwidth map allocation unit 808 implements statistics about requests for bandwidth among nodes in the whole network, and performs calculation for bandwidth map allocation.

The wavelength λc for the control channel and wavelength λd for the data channel splitted by the wave splitter 801 are transmitted to the control channel transceiving and processing unit 802 and the OB switching unit 804 respectively. At the master node, the control channel transceiving and processing unit 802 receives data transmitted via the wavelength λc, controls the OB switching unit 804, the client-side traffic processing unit 806, the burst receiving and transmitting unit 805 and the synchronization processing unit 807 according to information of a bandwidth map contained in the data, and transmits the requests for bandwidth uploaded by each slave node through the wavelength λc and its own request for bandwidth to the bandwidth map allocation unit 808. At each slave node, the control channel transceiving and processing unit 802 receives the data transmitted via the wavelength λc, extracts bandwidth map information transmitted to the slave node by the master node from the data, controls the OB switching unit 804, the client-side traffic processing unit 806, the burst receiving and transmitting unit 805 and the synchronization processing unit 807 according to the bandwidth map information, adds its own request for bandwidth into a message field of the wavelength λc, and transmits the request for bandwidth to the next node until the request for bandwidth is transmitted to the master node.

The synchronization processing unit 807 calculates a frame length, a timeslot number and a length of a guard interval according to a result of the loop length detection, and detects a timeslot synchronization state of each wavelength to ensure that the node may receive and transmit a burst timeslot at correct time points. If there exists a deviation about time for receiving and transmitting the burst timeslot, a timeslot synchronization function may be realized after detection and correction of the synchronization processing unit 807. Moreover, a clock transmission function may be realized, that is, a system clock is transmitted according to a control channel, and the clock is determined as a reference clock for reception and transmission of a data channel. Specifically: at the master node, a clock based on a local clock is transmitted to a control channel generator and the burst receiving and transmitting unit 805 of the node, and is determined as a reference clock of these receiving and transmitting units; and at the slave node, a clock based on a clock recovered by the control channel transceiving and processing unit 802 is transmitted to the control channel generator and the burst receiving and transmitting unit 805 of the node, and is determined as a reference clock of these receiving and transmitting units.

The OB switching unit 804 and the burst receiving and transmitting unit 805 implement control over reception and transmission on correct wavelengths and correct timeslots, or switching-on and off of the timeslots, optical power regulation and the like according to the allocation information of the bandwidth map and control of the synchronization processing unit 807. The OB switching unit 804 receives the data wavelength λd on a line-side optical link, and controls reception and transmission, switching on and off, optical power regulation and the like on each wavelength and each timeslot to realize an OB switching function of the wavelengths and the timeslots according to the allocation information of the bandwidth map; and the burst receiving and transmitting unit 805 is required to implement selective reception and adjustable transmitting of an OB packet, reception and transmission being required to be strictly performed on correct timeslots under the control of the synchronization processing unit 807, and interact with the client-side traffic processing unit 806 about received and transmitted burst data.

The client-side traffic processing unit 806 caches the data received and transmitted at a client side, generates a request for bandwidth according to the volume of cached data to be transmitted to another node, and transmits request for bandwidth information to the control channel transceiving and processing unit 802.

The bandwidth map allocation unit 808 is located in the master node, and does not exist in the slave node. The bandwidth map allocation unit 808 receives the requests for bandwidth of respective nodes from the control channel transceiving and processing unit 802, performs bandwidth map allocation calculation according to resources (such as the number of wavelengths and the number of timeslots) which may be allocated in an OB switching network and an allocation rule (such as adjustable transmitting, selective reception, relative positions of each node in the network and the number of transceiver ports), and transmits a result of final calculation to the control channel transceiving and processing unit 802.

It will be understood that the control channel transceiving and processing unit 802, client-side traffic processing unit 806, synchronization processing unit 807 and bandwidth map allocation unit 808 in the node device 80 may specifically be implemented in a CPU, a Micro Processing Unit (MPU), a Digital signal processor (DSP), an Field Programmable Gate Array (FPGA) or the like, and a specific hardware implementation process is a conventional technical means adopted by those skilled in the art, and will not be elaborated herein.

Figure 11:
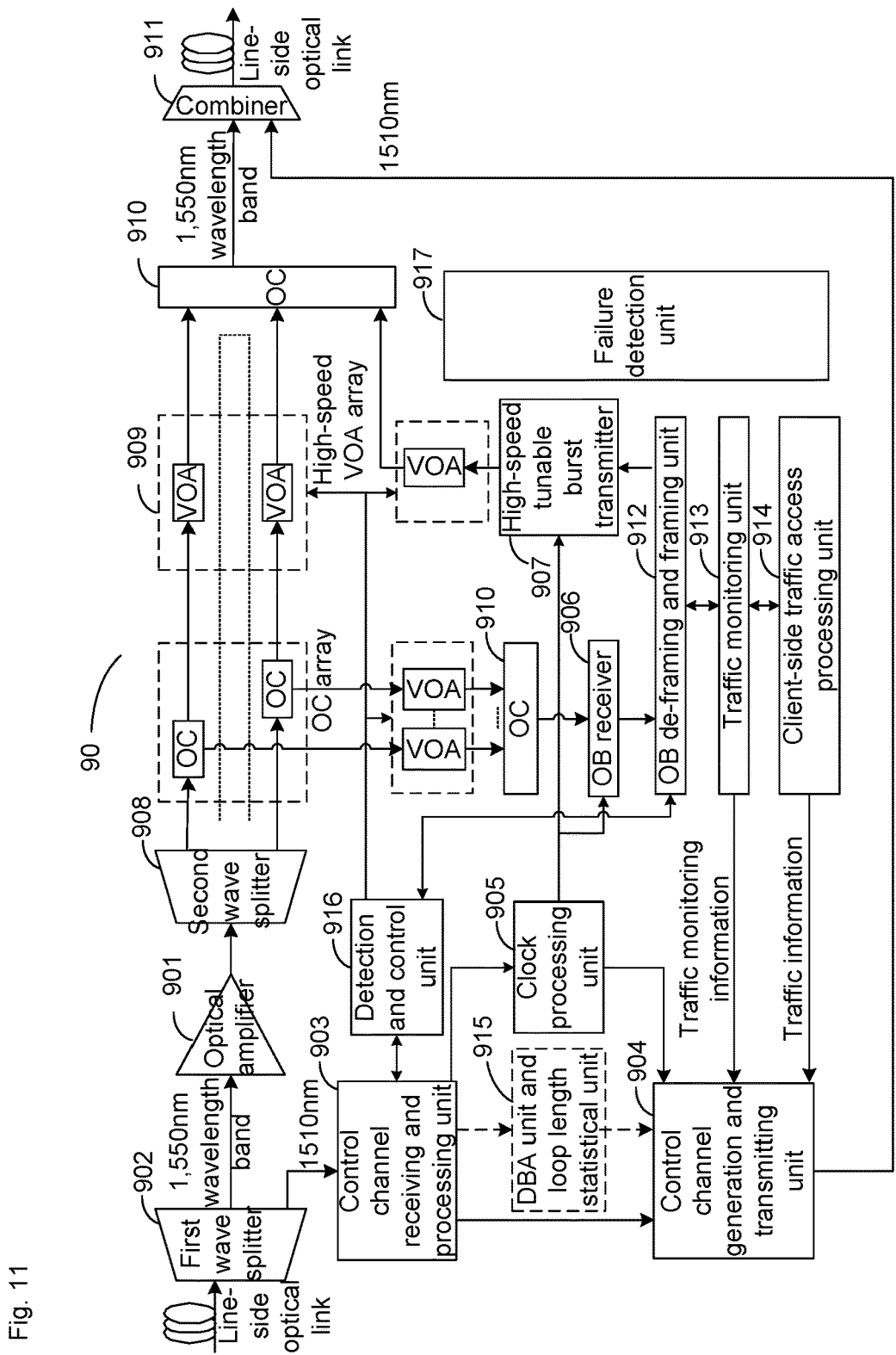
FIG. 11 is a schematic diagram of another node device according to an embodiment of the disclosure.

FIG. 11 is a schematic diagram of another node device 90 according to an embodiment of the disclosure, the node device 90 includes an optical amplifier 901, a first wave splitter 902, a control channel receiving and processing unit 903, a control channel generation and transmitting unit 904, a clock processing unit 905, an OB receiver 906, a high-speed tunable burst transmitter 907, a second wave splitter 908, a high-speed Variable Optical Attenuator (VOA) array 909, an Optical Coupler (OC) 910, a combiner 911, an OB de-framing and framing unit 912, a traffic monitoring unit 913, a client-side traffic access processing unit 914, a DBA unit and loop length statistic unit 915, a detection and control unit 916, a failure detection unit 917 and the like, and a specific operating manner of each unit is described below.

The optical amplifier 901 may specifically be an ordinary-mode optical amplifier, or a burst-mode optical amplifier. If the ordinary-mode optical amplifier is selected, it is necessary to strictly control optical power to keep the optical power stable without great optical power jitter within a short time, thereby amplifying optical power in a burst channel to make it possible to transmit an optical signal of an OBTN for a longer distance and compensate for optical power loss caused by each splitting unit; and in addition, if a control channel adopts a wavelength of 1,510 nm for transmission, the optical amplifier 901 performs wave splitting and combination on an optical signal with the wavelength of 1,510 nm transmitted in the control channel to implement reception and transmission of the control channel.

The control channel receiving and processing unit 903 is configured to implement signal receiving and processing of the control channel, and the processing includes clock recovery, extraction of information from bandwidth map, extraction of information from the request for bandwidth and the like, and may also include information about other control, alarming and the like. No matter whether the control channel adopts the wavelength of 1,510 nm or a wavelength of 1,550 nm, reception may be implemented, and a transmission rate is optionally 10.709 Gbps. When the node device 90 is a slave node 70, a recovered clock is transmitted to the clock processing unit 905; and when the node device 90 is a master node 60, the recovered clock is not required to be transmitted to the clock processing unit 905.

The control channel generation and transmitting unit 904 is configured to implement signal regeneration and transmitting of the control channel; and the control channel generation and transmitting unit 904 receives traffic information generated by the client-side traffic access processing unit 914, and receives traffic monitoring information generated by the traffic monitoring unit 913. The clock transmitted at each node is a clock output by the clock processing unit 905.

The clock processing unit 905 is configured to realize a clock transmission function of the control channel, and determine the clock as a reference clock for reception and transmission of a data channel. When the node device 90 is the master node 60, a clock based on a local clock is transmitted to the control channel generation and transmitting unit 904, the OB receiver 906 and the high-speed tunable burst transmitter 907, and is determined as a reference clock of these units; and when the node device 90 is the slave node 70, a clock based on a clock recovered by the control channel receiving and processing unit is transmitted to the control channel generation and transmitting unit 904, the OB receiver 906 and the high-speed tunable burst transmitter 907, and is determined as a reference clock of these units.

The OB receiver 906 is configured to implement reception of a burst signal at a line-side of the OBTN. A wideband receiver is adopted, burst optical signals of respective wavelengths within a wavelength band of 1,550 nm may be received, a rate is preferably 10.709 Gbps, and an internal amplifier may implement amplification of a burst packet.

The high-speed tunable burst transmitter 907 is configured to implement transmitting of signal at the line-side of the OBTN. A high-speed tunable laser with a wavelength interval of 50 GHz or 100 GHz is adopted, a burst optical signal is transmitted at 10.709 Gbps, and the aim of wavelength-tunable transmitting is fulfilled.

The high-speed variable optical attenuator (VOA) array 909 implements switching-on and off control and optical power control of an OB. A switching-on and off control speed of each VOA is lower than 1 μs, and high-speed switching-on and off selection of reception and transmission of an OB packet is implemented to fulfil the aim of optical switching. In addition, the aim of accurately controlling optical power of the OB packet may be fulfilled by optical power attenuation over each OB timeslot. If the high-speed tunable burst transmitter 907 has an optical power adjustment function, the VOAs connected to the high-speed tunable burst transmitter may be omitted.

The wave splitters, the OC 910 and the combiner 911 realize functions of wavelength separation, equal splitting or combination of optical power of a signal and wavelength convergence. The wave splitters may include the first wave splitter 902 and the second wave splitter 908, the former implements separation of the wavelength of 1,510 nm and wavelengths within the wavelength band of 1,550 nm, and the latter implements separation of the wavelengths within the wavelength band of 1,550 nm according to the interval of 50 GHz or 100 GHz.

The OB de-framing and framing unit 912 is configured to encapsulate and decapsulate traffic in form of burst packet and implements reception and transmission of a line-side traffic and packing and unpacking of the OB packet. During reception, a complete Optical Burst Unit (OBU) is found according to an OBU delimiter in the received data, and then is decapsulated to recover the data according to a definition about an OBU; and during transmitting, the burst packet is encapsulated according to the definition about the OBU.

The traffic monitoring unit 913 is configured to perform traffic management and control on received and transmitted traffic according to a certain rule to ensure the volume of traffic received and transmitted by a client side of each node wholly substantially equal to the volume of traffic received and transmitted on a line side to avoid congestion and implement management over traffic levels and the like.

The client-side traffic access processing unit 914 is configured to perform operations, such as queuing according to destination nodes, the traffic levels and the like, on the traffic on the client side. The client-side traffic access processing unit 914 reports traffic information such as depths of each queue to the control channel generation and transmitting unit 904 to form a request for bandwidth for reporting to the master node after queuing the traffic according to the destination nodes and the traffic levels.

The DBA unit and loop length statistic unit 915 performs bandwidth map allocation calculation according to a bandwidth report, measures a loop length of the network and calculates related attribute parameters such as a frame length and a guard interval for the timeslot. Only the master node 60 has such a function, performs bandwidth requirement cutting from the bandwidth reports uploaded by each slave node 70, implements DBA timeslot and wavelength allocation calculation, and performs loop length detection to further calculate the attribute parameters such as the length of data frame and the guard interval for the timeslot to ensure that the loop length is an integral multiple of the frame length.

The detection and control unit 916 implements control over reception and transmission over the data channel according to the information of bandwidth map. When the node device 90 is the slave node 70, control over reception and transmission of an OB packet on the data channel is implemented according to the bandwidth map transmitted by the master node 60, and adaption and framing operation is performed on data; and in addition, it is also necessary to detect a time deviation between a data frame and a control frame, perform accurate detection on an OB timeslot and determine accurate time of reception and transmission of the OB according to a result of the detection. The master node 60 is further required to detect whether the data frame is overlapped or not and whether it is necessary to regulate initial transmitting time of the control frame or not according to such a function unit.

The failure detection unit 917 is configured to monitoring operating states of the network and the nodes and optical power, and detect a magnitude of optical power of each OB, whether time positions of the OBs are abnormal or not, abnormalities of system clock transmission and the like.

It will be understood that the control channel receiving and processing unit 903, control channel generation and transmitting unit 904, clock processing unit 905, OB deframing and framing unit 912, traffic monitoring unit 913, client-side traffic access processing unit 914, DBA unit and loop length statistic unit 915, detection and control unit 916 and failure detection unit 917 in the node device 90 may specifically be implemented in a Central Processing Unit (CPU), a Micro Processing Unit (MPU), a Digital Signal Processor (DSP), a Field Programmable Gate Array (FPGA) or the like in a practical application, and a specific hardware implementation process is a conventional technical means adopted by those skilled in the art, and will not be elaborated herein.

Figure 12:
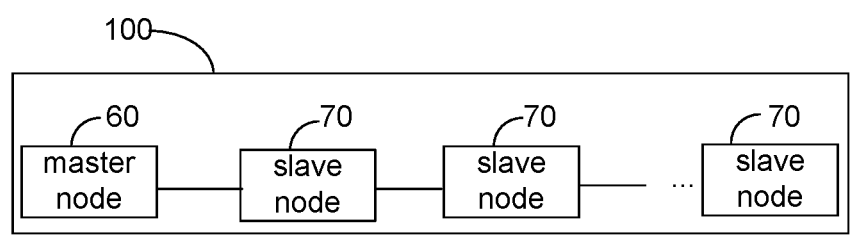
FIG. 12 is a schematic diagram of structure of an OBTN according to an embodiment of the disclosure.

Based on the abovementioned embodiment, the embodiment of the disclosure further provides an OBTN 100, and its structure diagram is shown in FIG. 12, including the master node 60 and at least one slave node 70.

The master node 60 is recited in any abovementioned embodiment and the at least one slave node 70 is recited in any abovementioned embodiment.

In the embodiments provided by the disclosure, it should be understood that the disclosed system, device and method may be implemented in other forms. For example, the device embodiment described above is only schematic, and for example, division of the modules or units is only division in terms of logical functions, and other division manners may be adopted in practical implementation. For example, multiple units or components may be combined or integrated into another system, or some characteristics may be omitted or not performed. In addition, displayed or discussed coupling or direct coupling or communication connection therebetween may be indirect coupling or communication connection implemented through some interfaces, devices or units, and may also be electrical and mechanical or adopt other forms.

The units described as separate parts may or may not be physically separated, and parts shown as units may or may not be physical units, and namely may be located in the same place or distributed to multiple network units. Part or all of the units may be selected to fulfil the aim of the solutions of the embodiment according to a practical requirement.

In addition, each function unit in each embodiment of the disclosure may be integrated into a processing unit, each unit may also physically exist independently, and two or more units may also be integrated into a unit. The integrated unit may be implemented in a hardware form, and may also be implemented in form of software function unit.

When being implemented in form of software function unit and sold or used as an independent product, the integrated unit may be stored in a computer-readable storage medium. Based on such an understanding, the technical solutions of the disclosure substantially or parts making contributions to a conventional art or all or part of the technical solutions may be embodied in form of software product, and the computer software product is stored in a storage medium having contained therein a plurality of instructions to enable a computer equipment (which may be a personal computer, a server, network equipment or the like) or processor to execute all or part of the steps of the embodiment of each embodiment. The storage medium includes various medium capable of storing program codes such as a U disk, a mobile hard disk, a Read-Only Memory (ROM), a magnetic disc or a compact disc.

The above is only the specific implementation mode of the disclosure and not intended to limit the scope of protection of the disclosure, and any variations or replacements apparent to those skilled in the art within technical scope of the disclosure shall fall within the scope of protection of the disclosure. Therefore, the scope of protection of the disclosure shall be subject to the scope of protection of the claims.

INDUSTRIAL APPLICABILITY

According to the embodiment of the disclosure, by network loop length detection of the master node and frame synchronization training and timeslot synchronization training over the nodes in the network, the network design may be simplified, construction cost of the OBTN may be lowered, flexible construction of the OBTN may be implemented without greatly limiting the throughput of the network, and increase of the operation rate of the network and improvement of the efficiency and throughput of the network are facilitated.

What is claimed is:

1. A transmission method for an Optical Burst Transport Network (OBTN), comprising:

measuring, by a master node, a network loop length of the OBTN, and calculating, by the master node, a length of a data frame, the number of timeslots in the data frame, a length of the timeslot and a guard interval for the timeslot according to a result of the measurement;

transmitting, by the master node, a test data frame and a test control frame to a slave node according to the calculated length of the data frame, number of the timeslots in the data frame, length of the timeslot and guard interval for the timeslot, for performing frame synchronization training and timeslot synchronization training, wherein performing frame synchronization training and timeslot synchronization training comprises: acquiring a time delay between time when the test Control frame is returned to the master node and time when the test data frame is returned to the master node; and acquiring a time Interval between time when the master node transmits a control frame and time when the master node transmits a data frame after transmitting the control frame, wherein the time interval contains the time delay, and wherein the test data frame and the data frame are transmitted through a data channel, the test control frame and the control frame are transmitted through a control channel, and the control channel and the data channel are independent of each other;

transmitting, by the master node, the data frame and the control frame to the slave node according to a result of the frame synchronization training and a result of the timeslot synchronization training, wherein the control frame contains a bandwidth map; and performing, by the master node, bandwidth allocation calculation according to a request for bandwidth transmitted by the slave node, and generating and transmitting, by the master node, a new bandwidth map to the slave node.

2. The method according to claim 1, wherein the step of measuring, by the master node, the network loop length of the OBTN comprises:

measuring a loop length of the control channel of the OBTN and a loop length of the data channel of the OBTN, wherein measuring the loop length of the data channel of the OBTN comprises: transmitting, by any node in the OBTN, an Optical Burst (OB) packet to the master node via the data channel of the OBTN; and measuring, by the master node, a first time difference between two successive receptions of the OB packet, and determining the first time difference as the loop length of the data channel of the OBTN; and measuring the loop length of the control channel of the OBTN comprises: determining a second time difference between time when a header of the control frame is transmitted by the master node and time when the header of the control frame is received by the master node as the loop length of the control channel of the OBTN.

3. The method according to claim 2, wherein the step of acquiring a time delay between time when the test control frame is returned to the master node and time when the test data frame is returned to the master node comprises:

transmitting, by the master node, the test data frame and the test control frame, and measuring, by the master node, the time delay between time when the test control frame is returned to the master node and time when the test data frame is returned to the master node; or determining a difference value between the second time difference and the first time difference as the time delay between time when the test control frame is returned to the master node and time when the test data frame is returned to the master node.

4. The method according to claim 2, wherein the test control frame contains information about the length of the data frame, the number of the timeslots in the data frame, the length of the timeslot and the guard interval for the timeslot.

5. The method according to claim 4, wherein the step of acquiring a time delay between time when the test control frame is returned to the master node and time when the test data frame is returned to the master node comprises:

transmitting, by the master node, the test data frame and the test control frame, and measuring, by the master node, the time delay between time when the test control frame is returned to the master node and time when the test data frame is returned to the master node; or determining a difference value between the second time difference and the first time difference as the time delay between time when the test control frame is returned to the master node and time when the test data frame is returned to the master node.

6. The method according to claim 1, wherein the test control frame contains information about the length of the data frame, the number of the timeslots in the data frame, the length of the timeslot and the guard interval for the timeslot.

7. A master node, comprising:

a measurement unit configured to measure a network loop length of an Optical Burst Transport Network (OBTN);

a calculation unit configured to calculate a length of a data frame, the number of timeslots in the data frame, a length of the timeslot and a guard interval for the timeslot according to a result of the measurement of the measurement unit;

a first transmitting unit configured to transmit a test data frame and a test control frame to a slave node according to the calculated length of the data frame, number of the timeslots in the data frame, length of the timeslot and guard interval for the timeslot;

a first training unit configured to perform frame synchronization training and timeslot synchronization training according to the test data frame and the test control frame transmitted by the first transmitting unit by: acquiring a time delay between time when the test control frame is returned to the master node and time when the test data frame is returned to the master node; and acquiring a time interval between time when the master node transmits a control frame and time when the master node transmits a data frame after transmitting the control frame, wherein the time interval contains the time delay, and wherein the test data frame and the data frame are transmitted through a data channel, the test control frame and the control frame are transmitted through a control channel, and the control channel and the data channel are independent of each other;

wherein the first transmitting unit is further configured to transmit the data frame and the control frame according to results of the frame synchronization training and timeslot synchronization training performed by the first training unit, wherein the control frame contains a bandwidth map;

a first receiving unit configured to receive a request for bandwidth;

a generation unit configured to perform bandwidth allocation calculation according to the request for bandwidth, and generate a new bandwidth map; and wherein the first transmitting unit is further configured to transmit the new bandwidth map.

8. The master node according to claim 7, wherein the measurement unit is configured to measure a loop length of the control channel of the OBTN and a loop length of the data channel of the OBTN,
wherein the operation that the measurement unit measures the loop length of the data channel of the OBTN comprises that: a first time difference between two successive receptions of an Optical Burst (OB) packet is determined as the network loop length of the OBTN, wherein the OB packet is transmitted from any node in the OBTN to the master node via the data channel of the OBTN; and
the operation that the measurement unit measures the loop length of the control channel of the OBTN comprises that: a second time difference between time when a header of the control frame is transmitted by the master node and time when the header of the control frame is received by the master node is determined as the loop length of the control channel of the OBTN.

9. The master node according to claim 8, wherein the first training unit is configured to measure the time delay between time when the test control frame is returned to the master node and time when the test data frame is returned to the master node, after the test data frame and the test control frame are transmitted; or, determine a difference value between the second rime difference and the first time difference as the time delay between time when the test control frame is returned to the master node and time when the test data frame is returned to the master node.

10. The master node according to claim 8, wherein
the test control frame contains information about the length of the data frame, the number of the timeslots in the data frame, the length of the timeslot and the guard interval for the timeslot.

11. The master node according to claim 10, wherein the first training unit is configured to measure the time delay between time when the test control frame is returned to the master node and time when the test data frame is returned to the master node, after the test data frame and the test control frame are transmitted; or, determine a difference value between the second time difference and the first time difference as the time delay between time when the test control frame is returned to the master node and time when the test data frame is returned to the master node.

12. The master node according to claim 7, wherein
the test control frame contains information about the length of the data frame, the number of the timeslots in the data frame, the length of the timeslot and the guard interval for the timeslot.

13. A non-transitory computer storage medium having stored therein computer-executable instructions for executing a transmission method for an Optical Burst Transport Network (OBTN), the transmission method comprising:
measuring, by a master node, a network loop length of the OBTN, and calculating, by the master node, a length of a data frame, the number of timeslots in the data frame, a length of the timeslot and a guard interval for the timeslot according to a result of the measurement;
transmitting, by the master node, a test data frame and a test control frame to a slave node according to the calculated length of the data frame, number of the timeslots in the data frame, length of the timeslot and guard interval for the timeslot, for performing frame synchronization training and timeslot synchronization training, wherein performing frame synchronization training and timeslot synchronization training comprises: acquiring a time delay between time when the test control frame is returned to the master node and time when the test data frame is returned to the master node; and acquiring a time interval between time when the master node transmits a control frame and time when the master node transmits a data frame after transmitting the control frame, wherein the time interval contains the time delay, and wherein the test data frame and the data frame are transmitted through a data channel, the test control frame and the control frame are transmitted through a control channel, and the control channel and the data channel are independent of each other;
transmitting, by the master node, the data frame and the control frame to the slave node according to a result of the frame synchronization training and a result of the timeslot synchronization training, wherein the control frame contains a bandwidth map; and
performing, by the master node, bandwidth allocation calculation according to a request for bandwidth transmitted by the slave node, and generating and transmitting, by the master node, a new bandwidth map to the slave node.

* * * * *